(12) United States Patent
Woo et al.

(10) Patent No.: US 11,996,736 B2
(45) Date of Patent: May 28, 2024

(54) SENSING DEVICE

(71) Applicant: LG INNOTEK CO., LTD., Seoul (KR)

(72) Inventors: Myung Chul Woo, Seoul (KR); Sung Min Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 638 days.

(21) Appl. No.: 17/268,708

(22) PCT Filed: Aug. 22, 2019

(86) PCT No.: PCT/KR2019/010682
§ 371 (c)(1),
(2) Date: Feb. 16, 2021

(87) PCT Pub. No.: WO2020/040563
PCT Pub. Date: Feb. 27, 2020

(65) Prior Publication Data
US 2021/0175760 A1 Jun. 10, 2021

(30) Foreign Application Priority Data

Aug. 23, 2018 (KR) .................. 10-2018-0098735
Aug. 23, 2018 (KR) .................. 10-2018-0098776

(51) Int. Cl.
*H02K 1/18* (2006.01)
*B62D 15/02* (2006.01)
(Continued)

(52) U.S. Cl.
CPC ......... *H02K 1/185* (2013.01); *B62D 15/0215* (2013.01); *G01L 3/10* (2013.01); *H02K 11/24* (2016.01); *G01L 3/104* (2013.01)

(58) Field of Classification Search
CPC .... H02K 1/185; H02K 11/24; B62D 15/0215; B62D 6/10; G01L 3/10; G01L 3/104; G01L 5/221
See application file for complete search history.

(56) References Cited

U.S. PATENT DOCUMENTS 9,321,172 B2 * 4/2016 Johnson ................. H02K 11/25
2002/0079769 A1 * 6/2002 Akiwa .................... H02K 1/187
310/90
(Continued)

FOREIGN PATENT DOCUMENTS

DE 10 2005 011196 A1 9/2006
EP 3875933 A1 * 9/2021
(Continued)

*Primary Examiner* — Francis C Gray
(74) *Attorney, Agent, or Firm* — Birch, Stewart, Kolasch & Birch, LLP

(57) ABSTRACT

An embodiment may provide a sensing device including a stator including a stator tooth and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction from a center of the stator, the stator includes a stator holder and a stator body which is coupled to the stator holder and on which the first stator tooth and the second stator tooth are disposed, the stator body includes a protrusion, and the protrusion is in contact with a lower end of the first stator tooth or a lower end of the second stator tooth.

14 Claims, 40 Drawing Sheets

(51) Int. Cl.
*G01L 3/10* (2006.01)
*H02K 11/24* (2016.01)

(56) References Cited

U.S. PATENT DOCUMENTS

| | | | | |
|---|---|---|---|---|
| 2003/0127273 | A1* | 7/2003 | Fukumoto | B62D 6/10 |
| | | | | 180/400 |
| 2005/0172727 | A1 | 8/2005 | Pattok et al. | |
| 2010/0319466 | A1* | 12/2010 | Bae | G01L 3/104 |
| | | | | 73/862.325 |
| 2013/0305843 | A1 | 11/2013 | Lee et al. | |
| 2016/0016607 | A1 | 1/2016 | Yoshida et al. | |
| 2022/0214236 | A1* | 7/2022 | Byun | B62D 15/0215 |

FOREIGN PATENT DOCUMENTS

| | | |
|---|---|---|
| KR | 20-2009-0002543 U | 3/2009 |
| KR | 10-2009-0106186 A | 10/2009 |
| KR | 10-2013-0136765 A | 12/2013 |
| KR | 10-1552463 B1 | 9/2015 |

* cited by examiner

[FIG. 1]
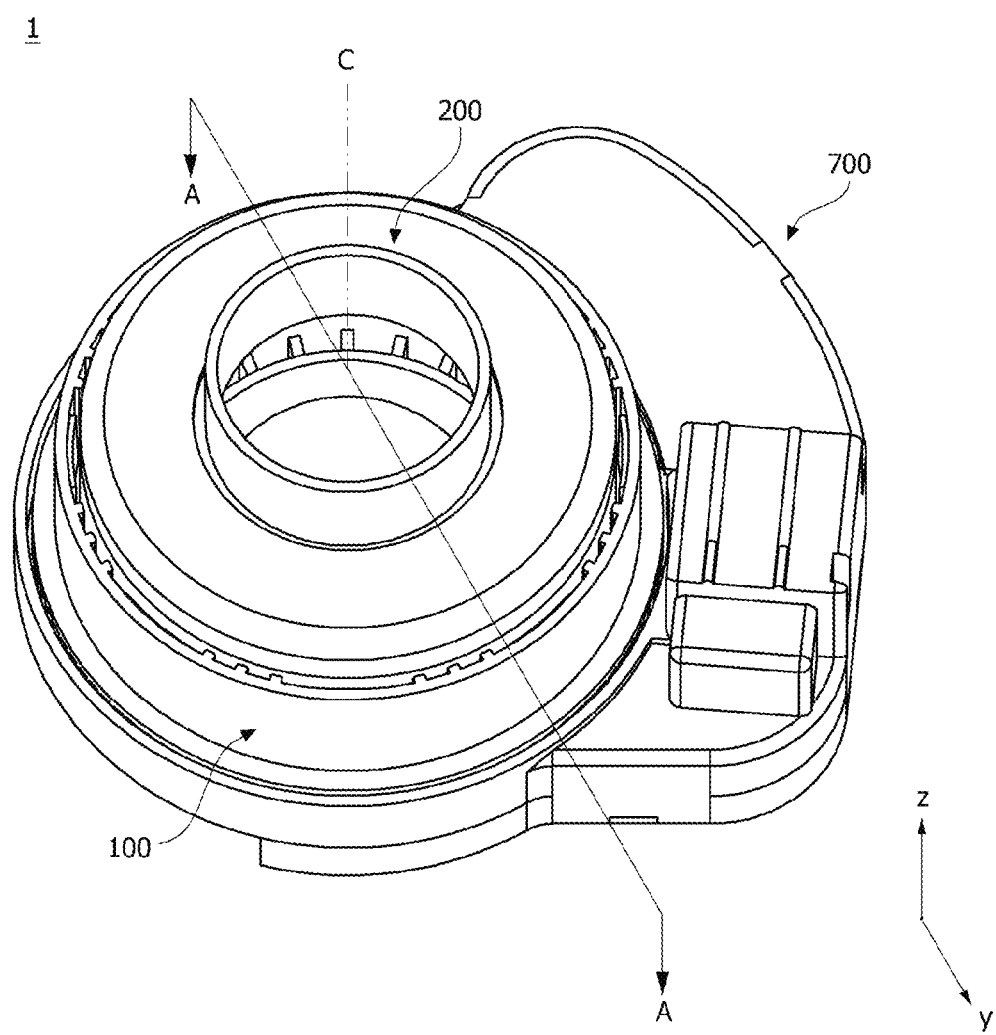

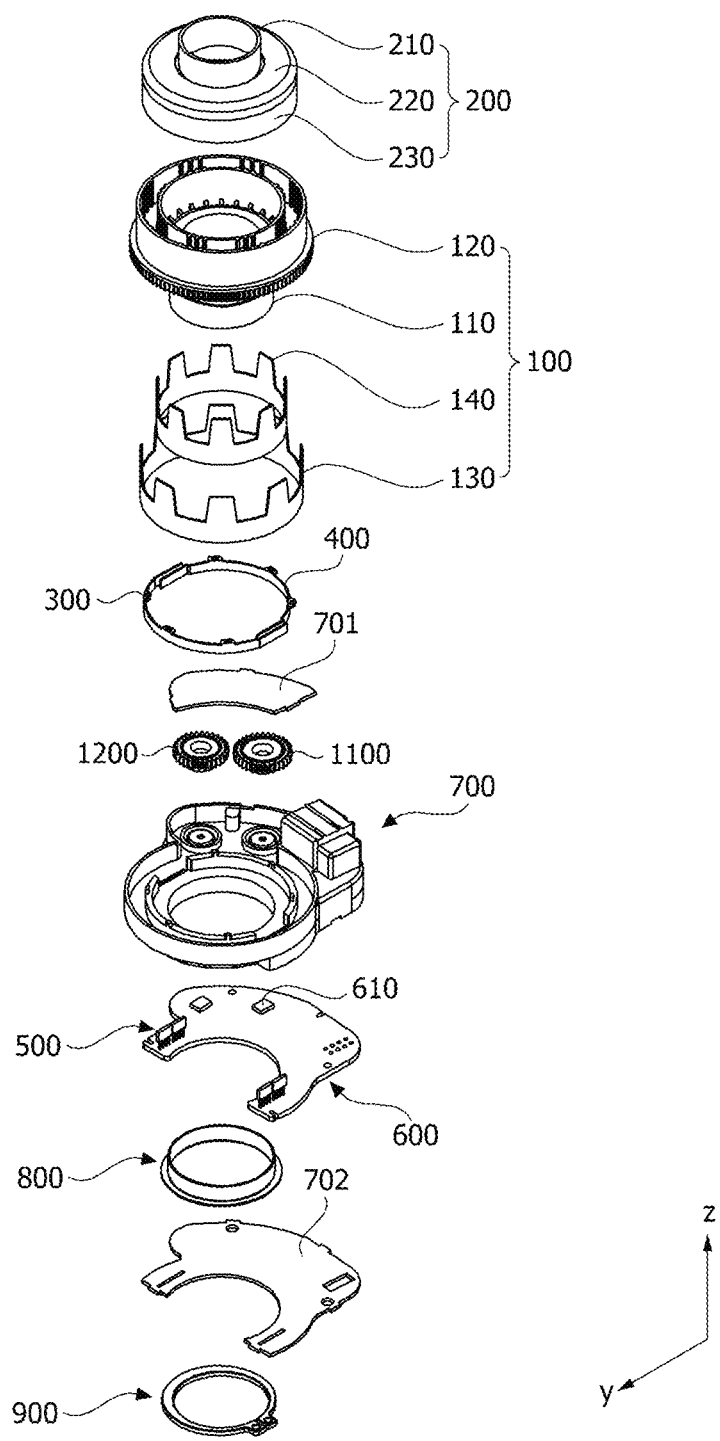
[FIG. 2]

[FIG. 3]
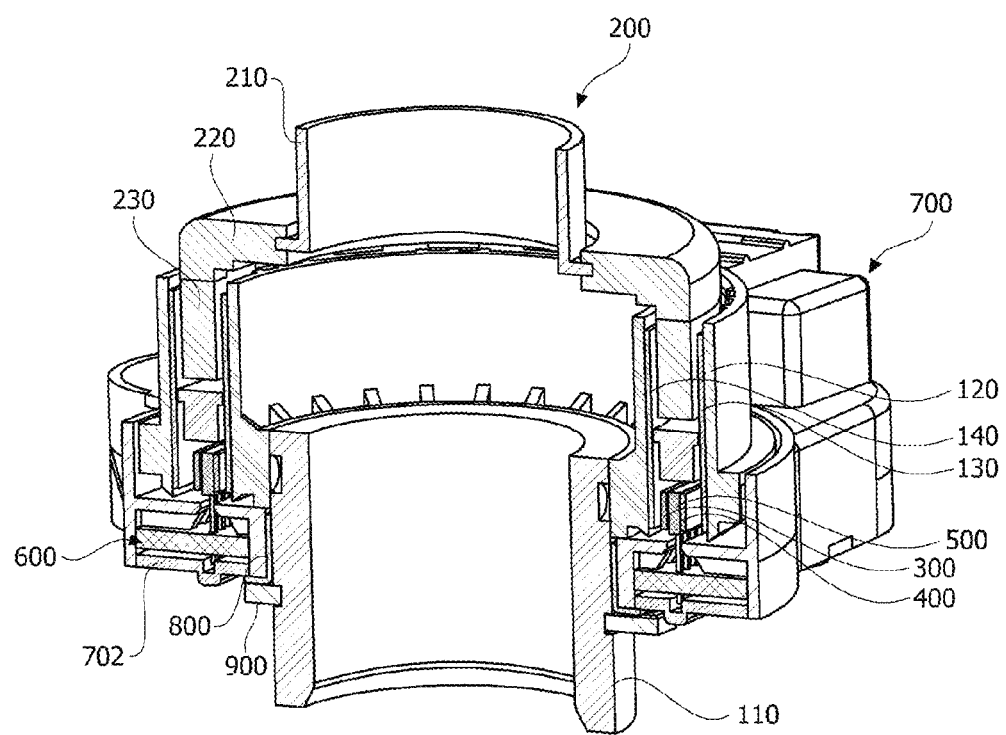

[FIG. 4]
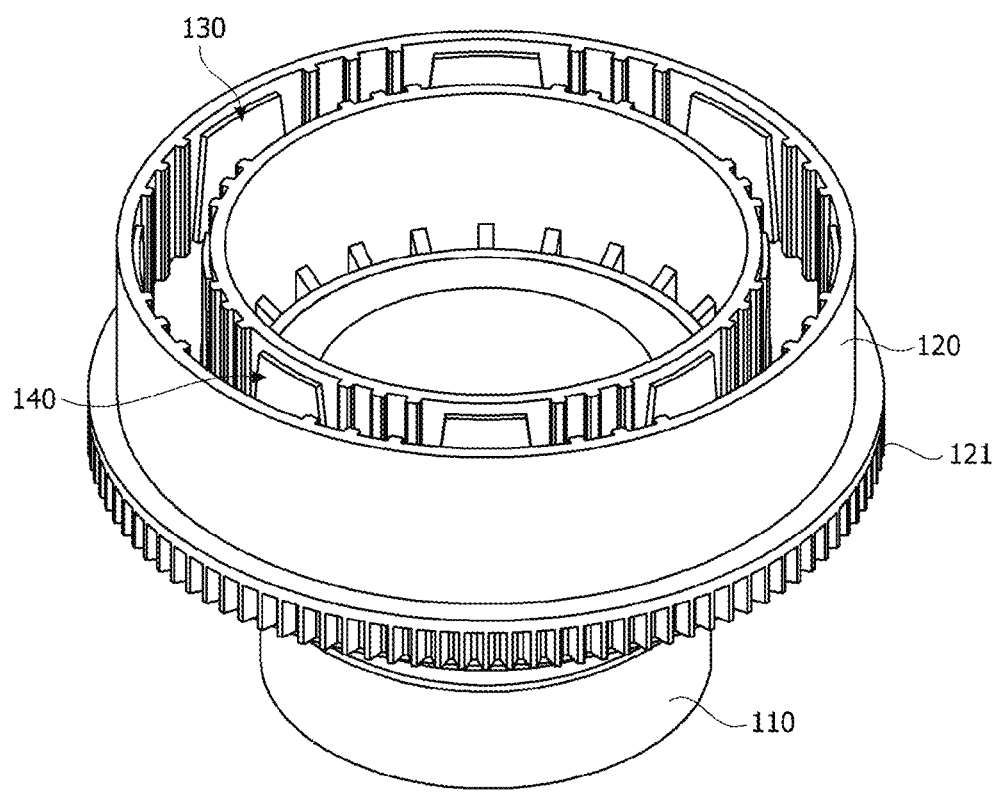

[FIG. 5]
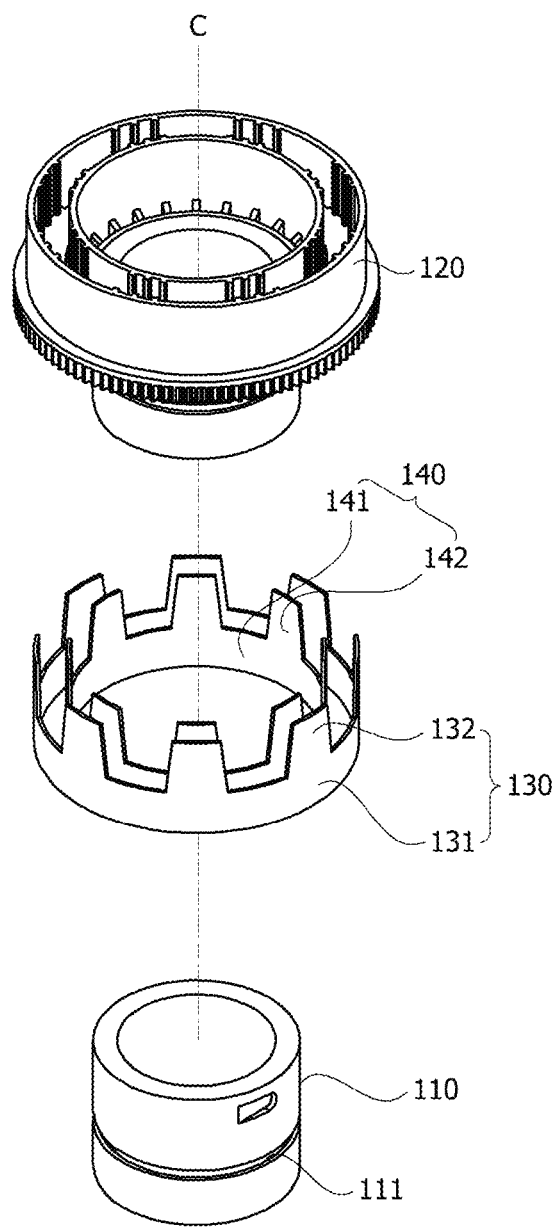

[FIG. 6]
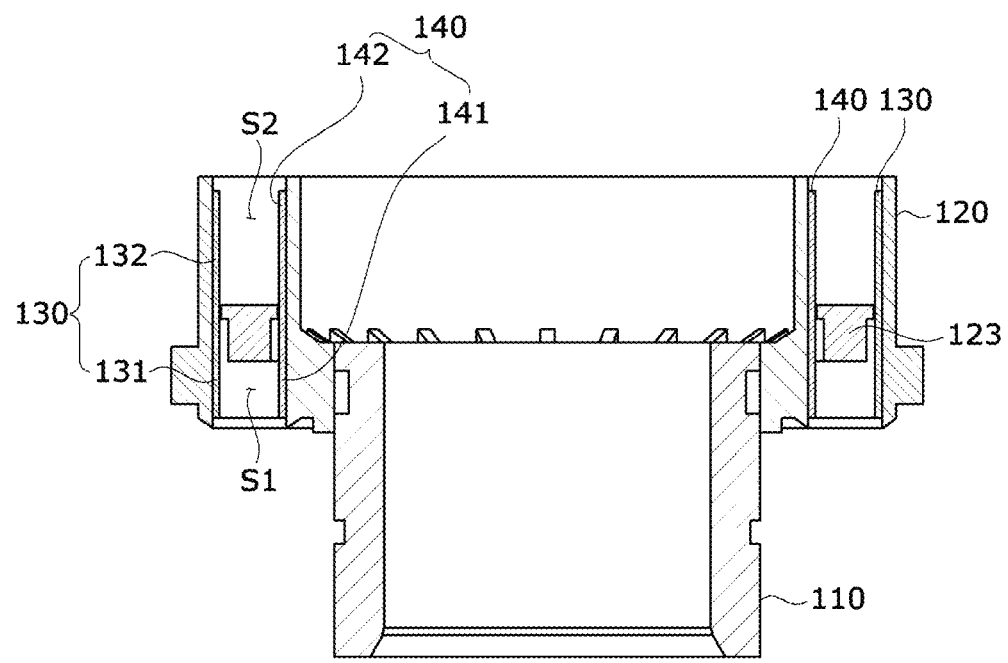

[FIG. 7]
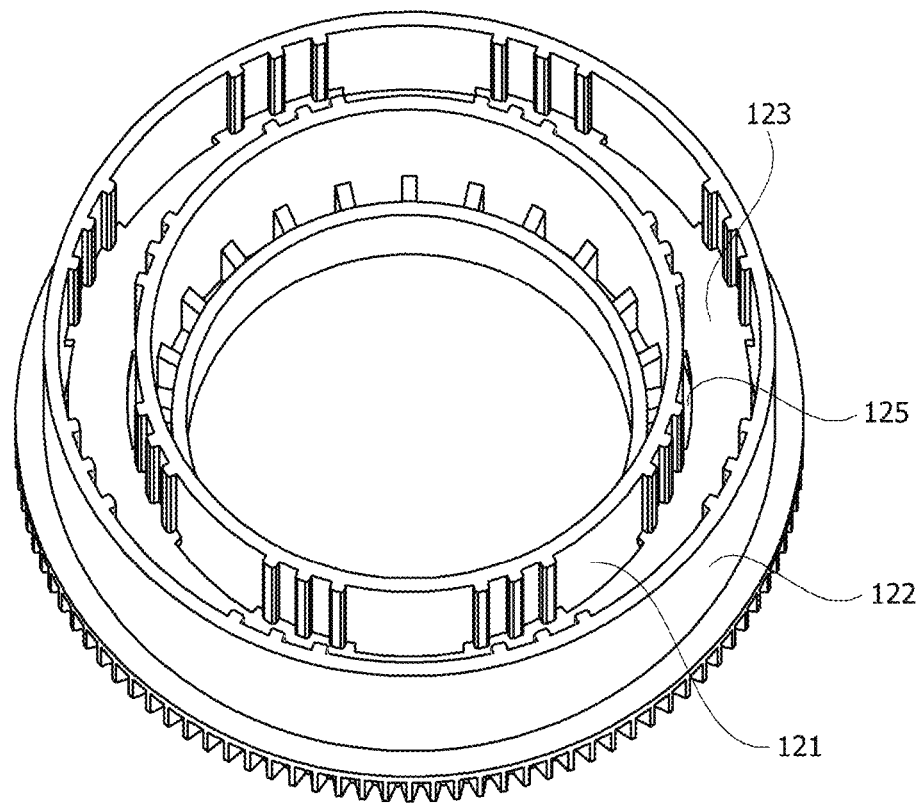

[FIG. 8]
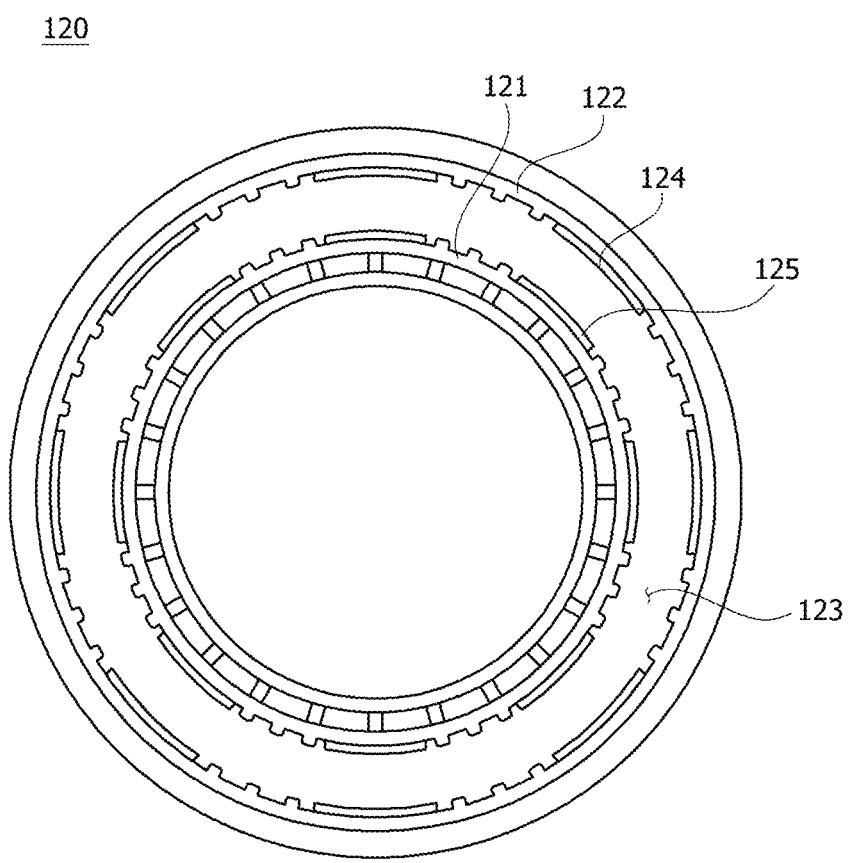

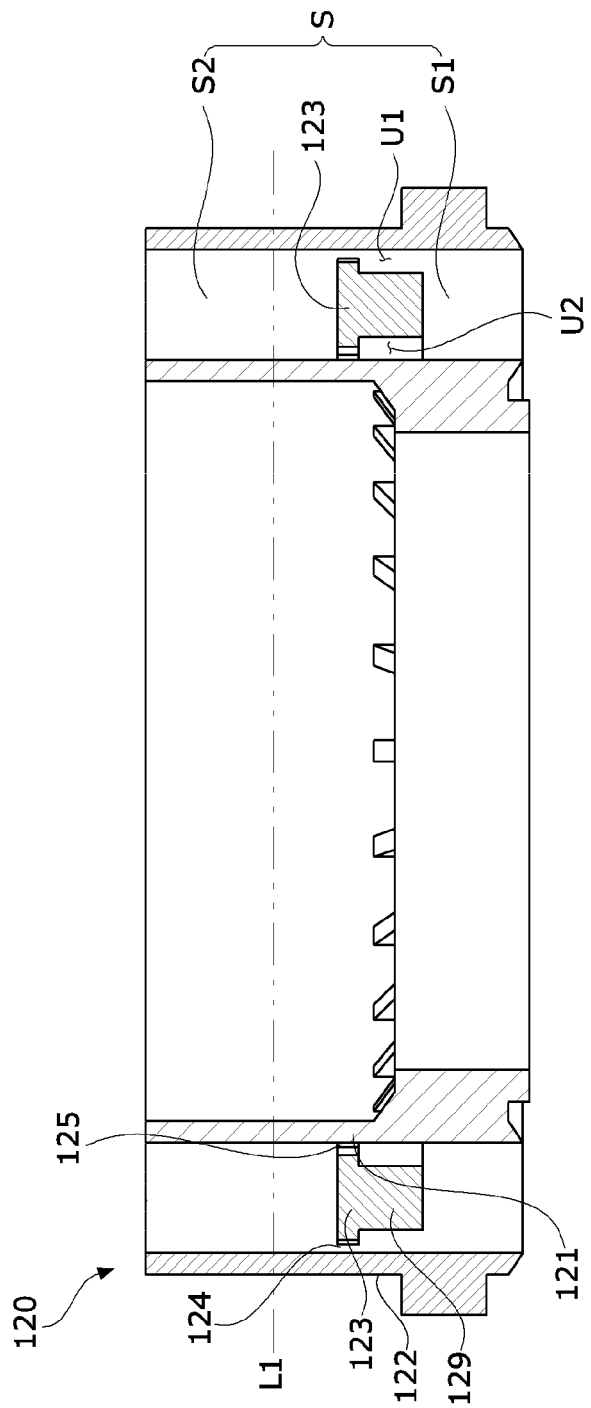
[FIG. 9]

[FIG. 10]
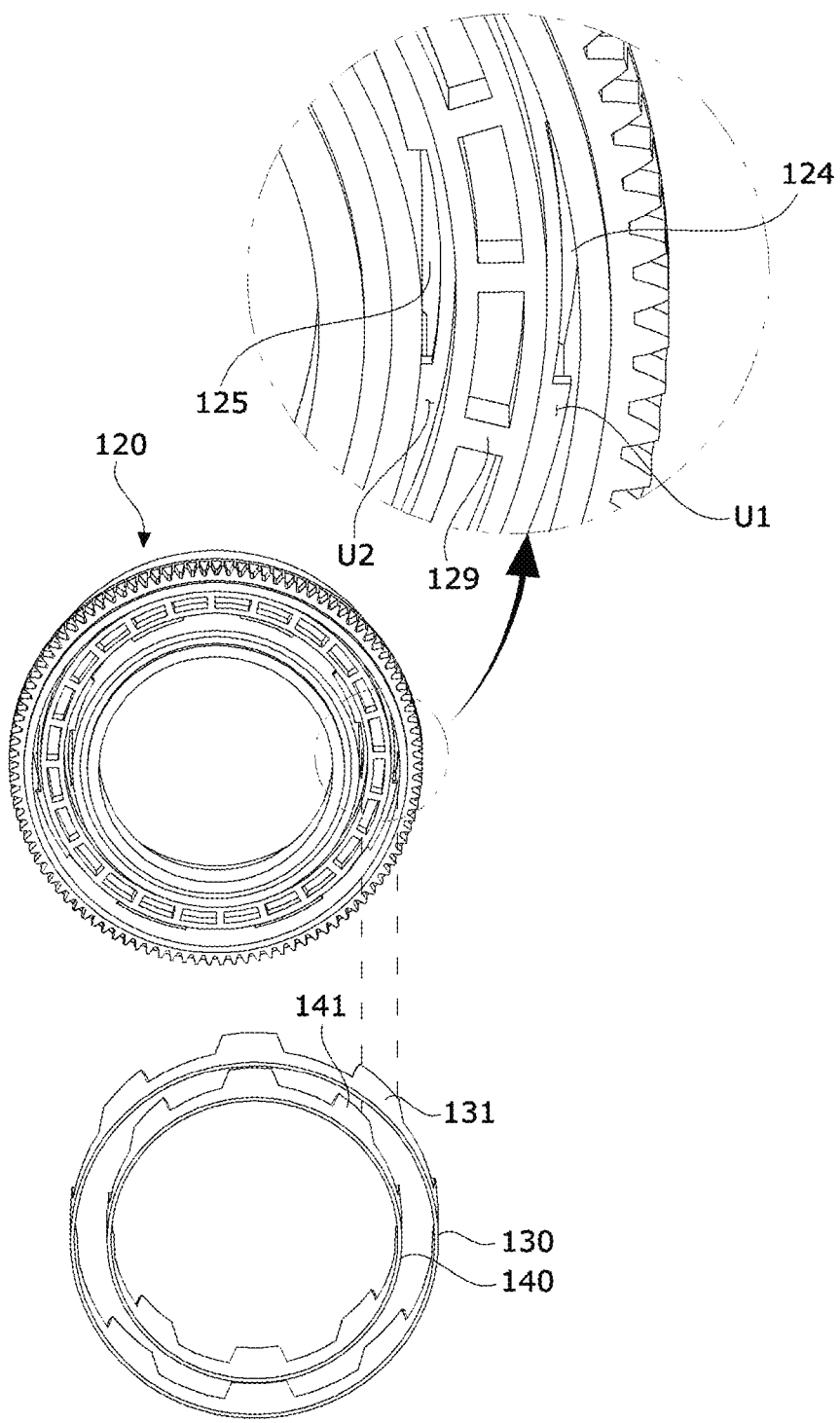

[FIG. 11]
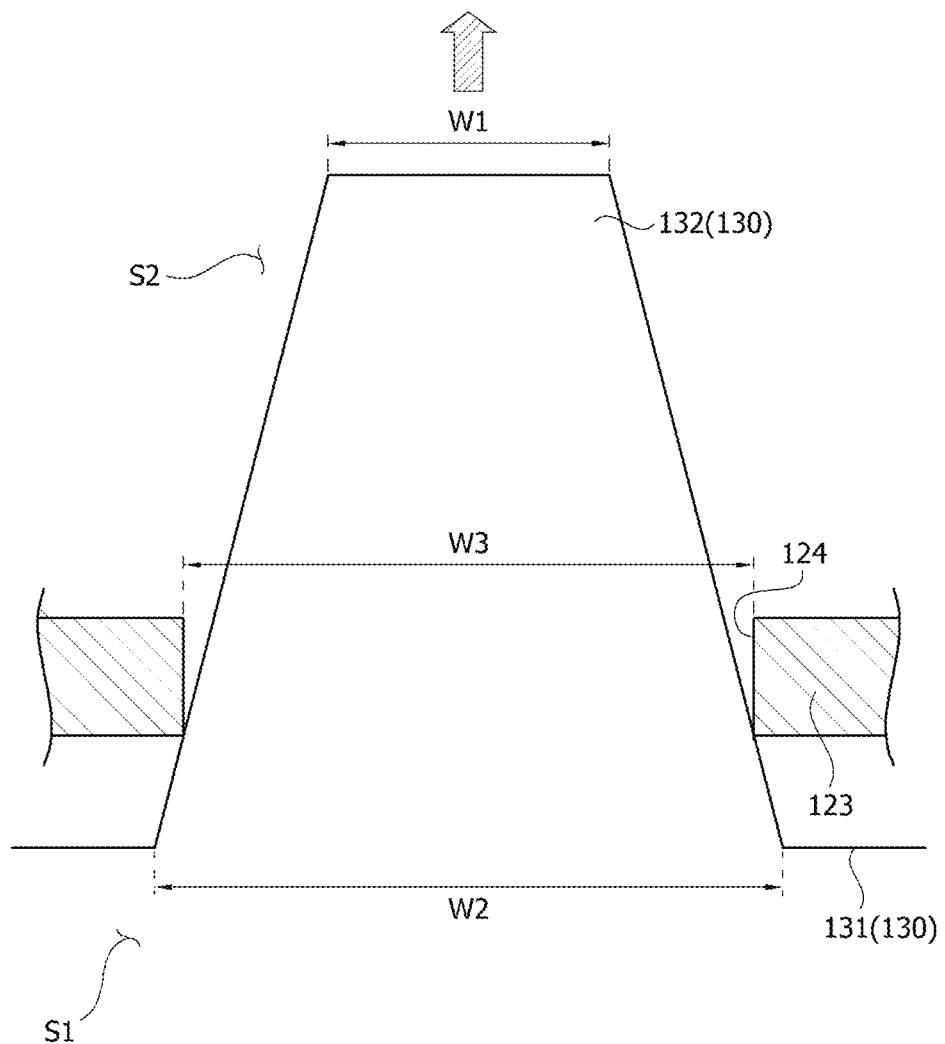

[FIG. 12]
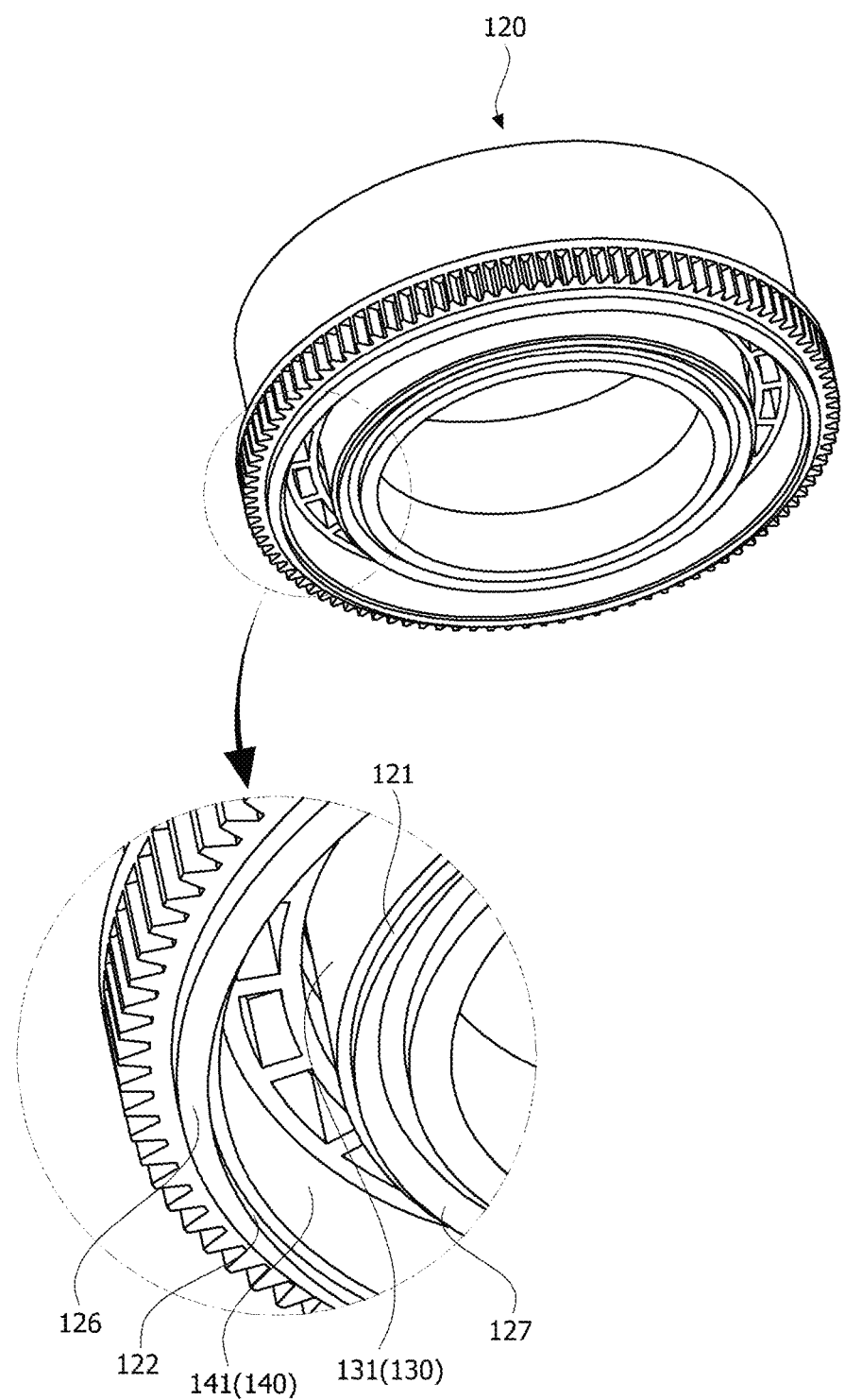

[FIG. 13]
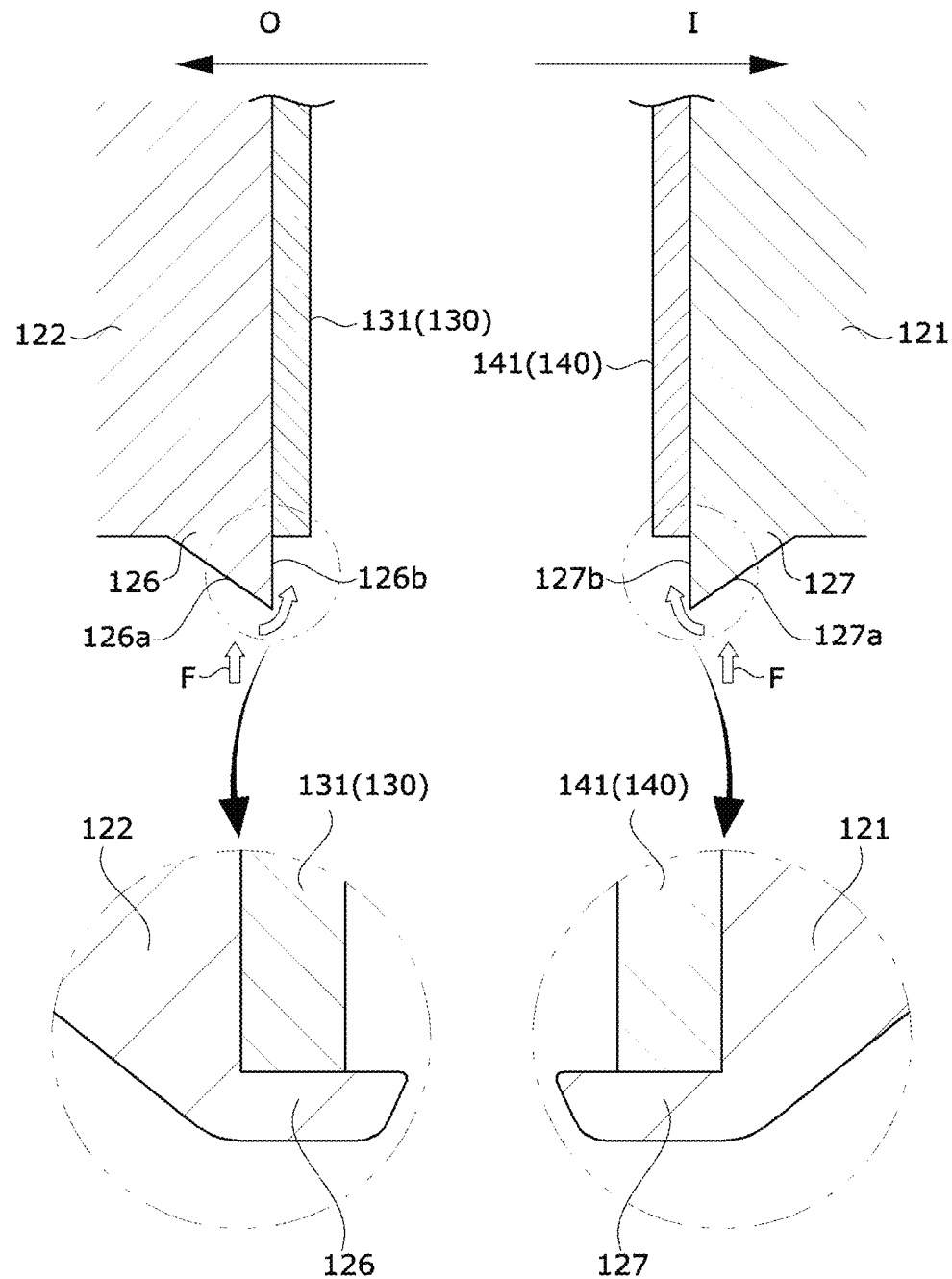

[FIG. 14]
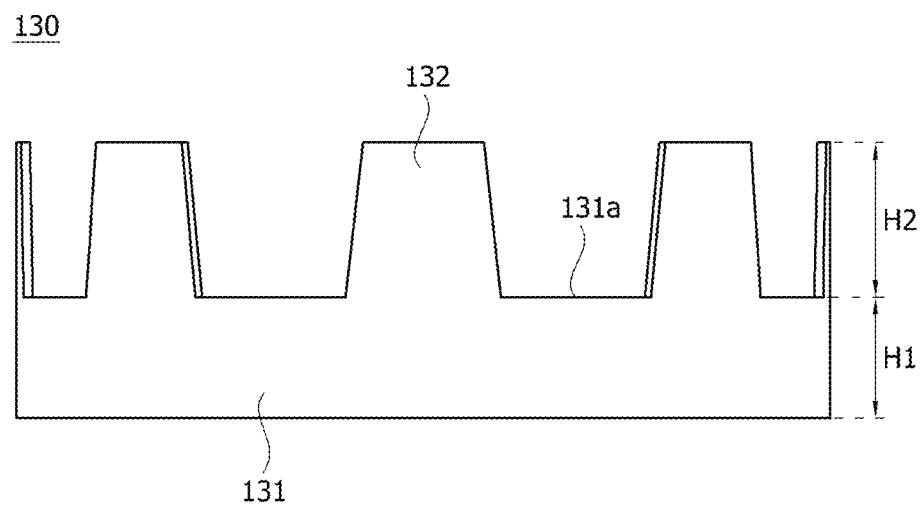

[FIG. 15]
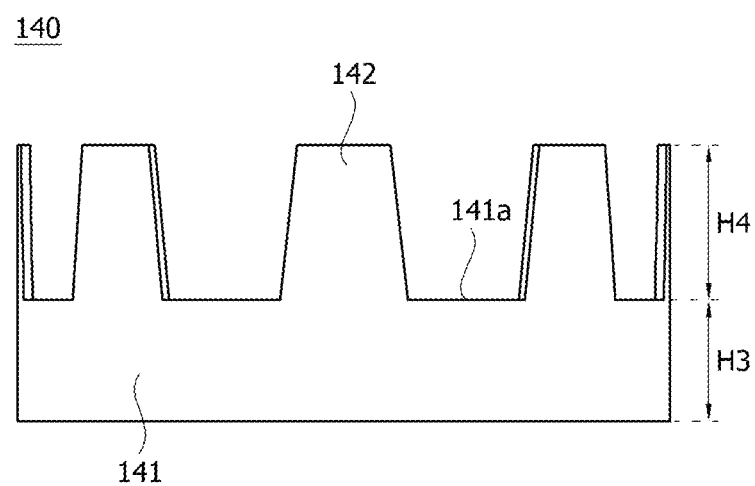

[FIG. 16]
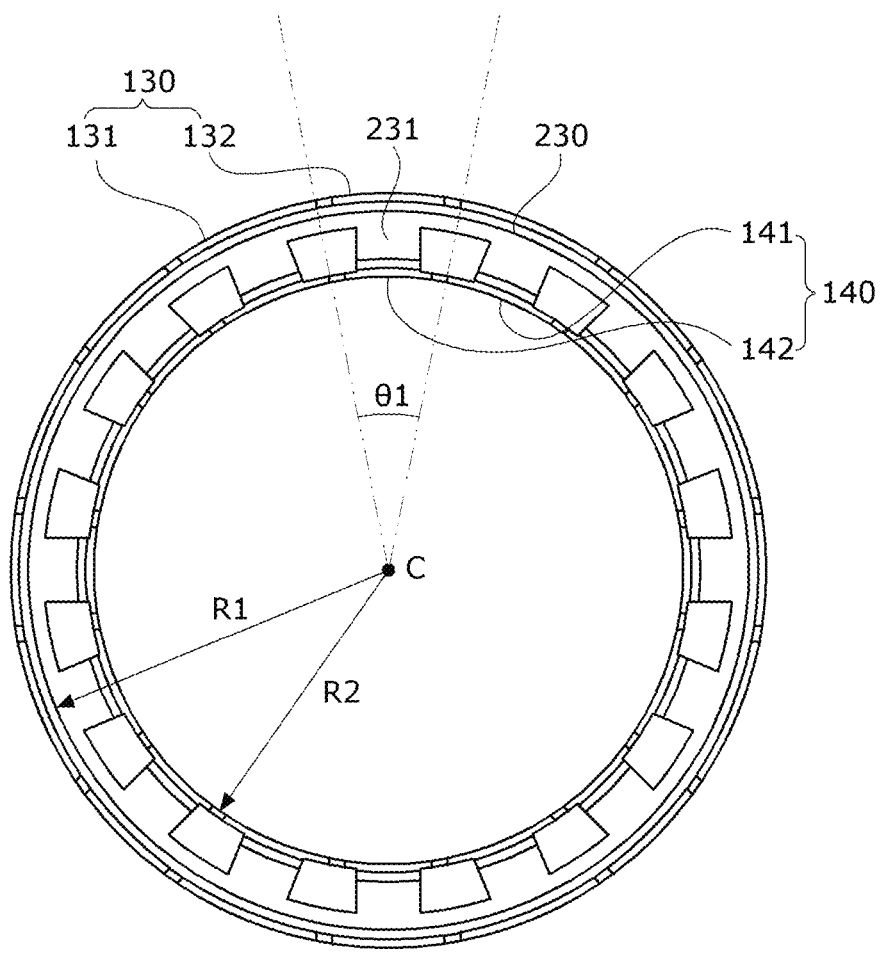

[FIG. 17]
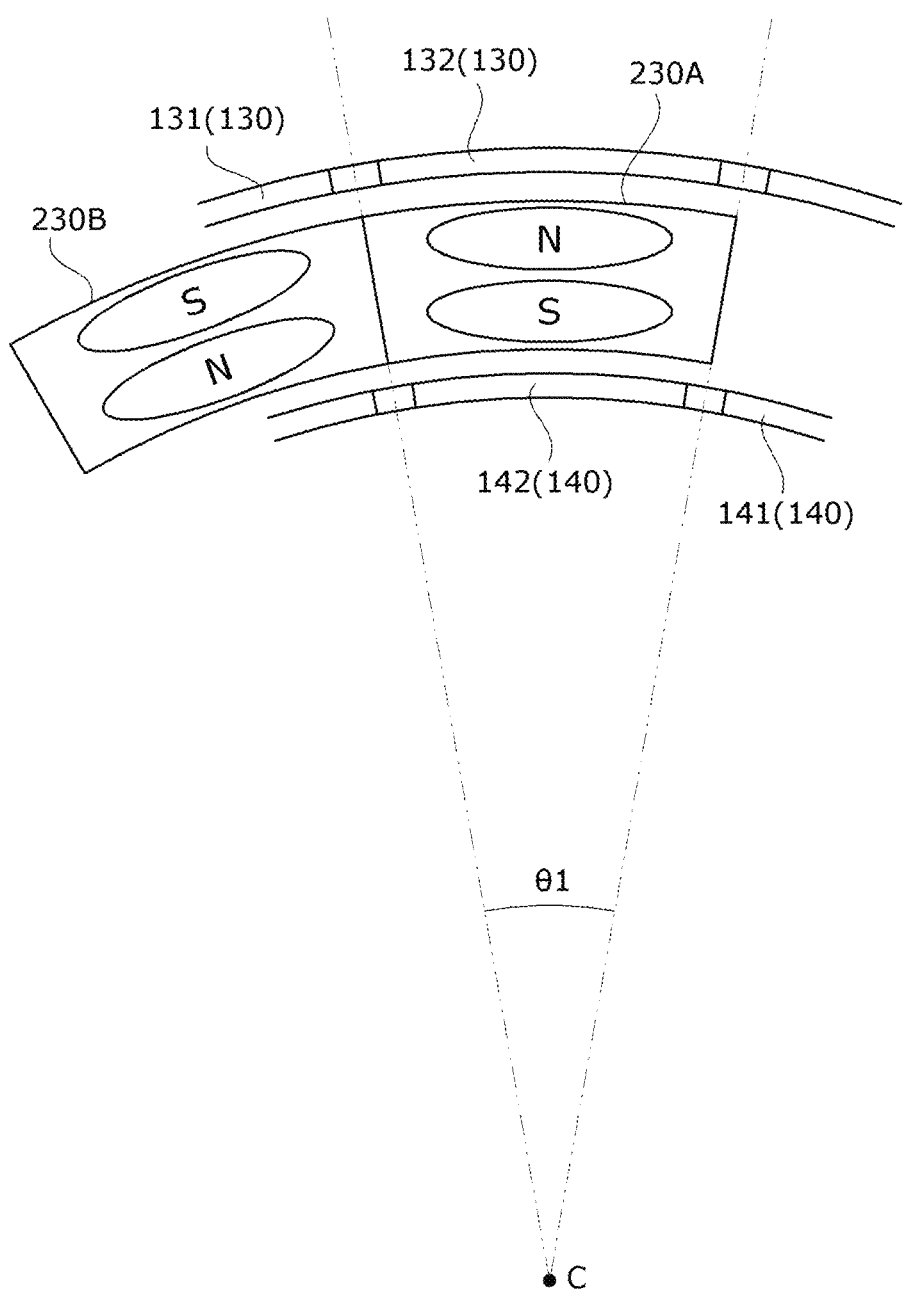

[FIG. 18]
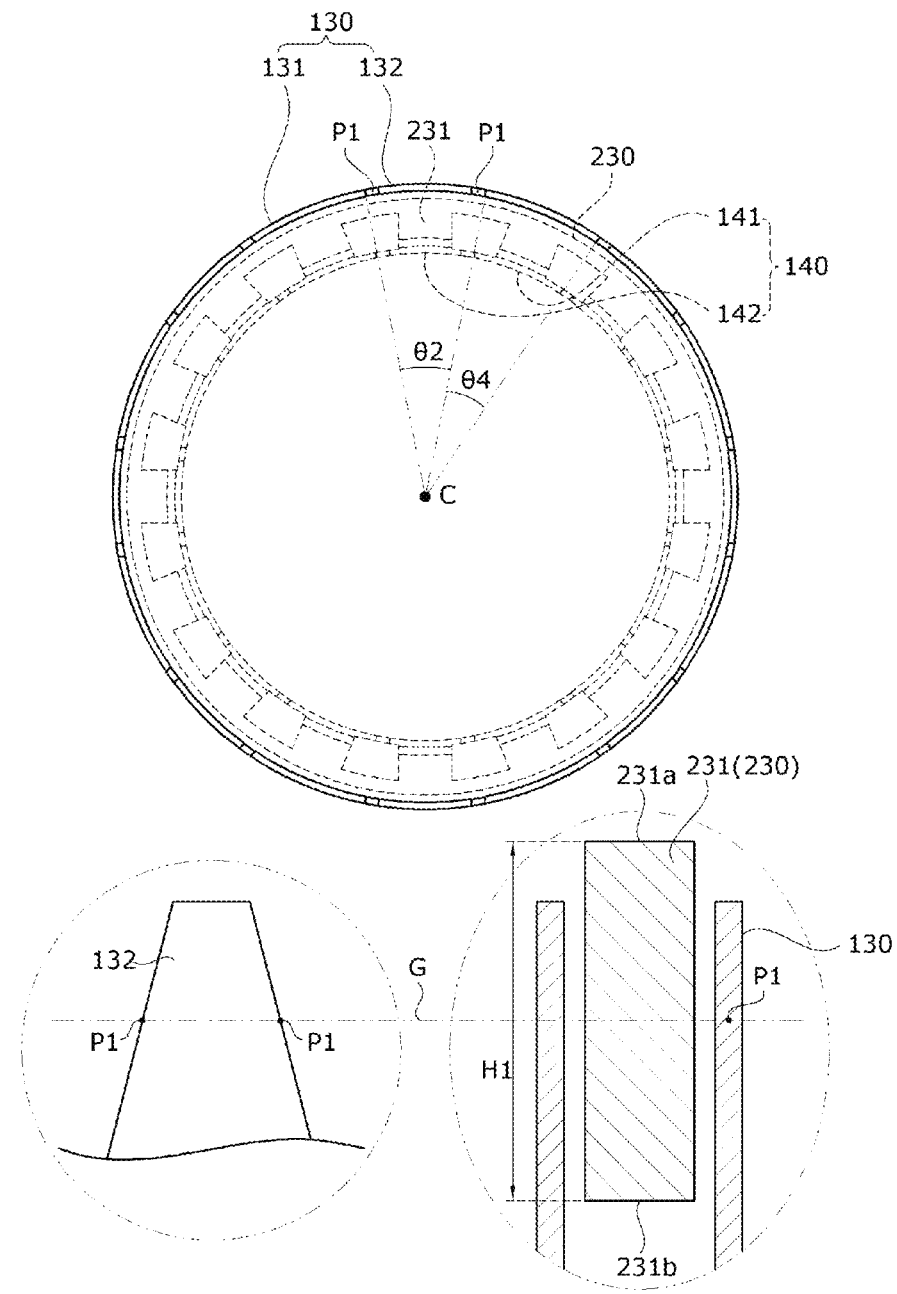

[FIG. 19]
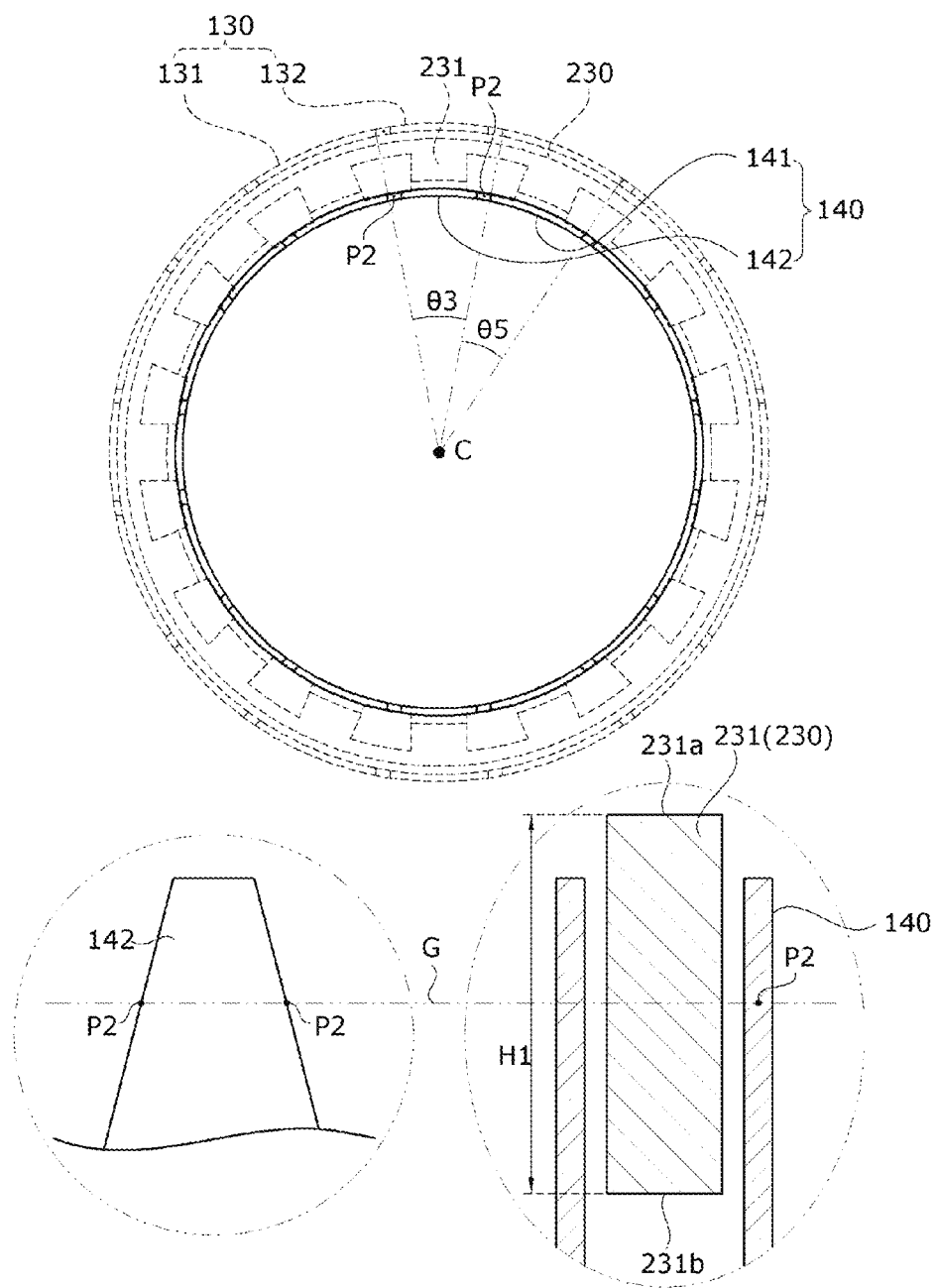

[FIG. 20]
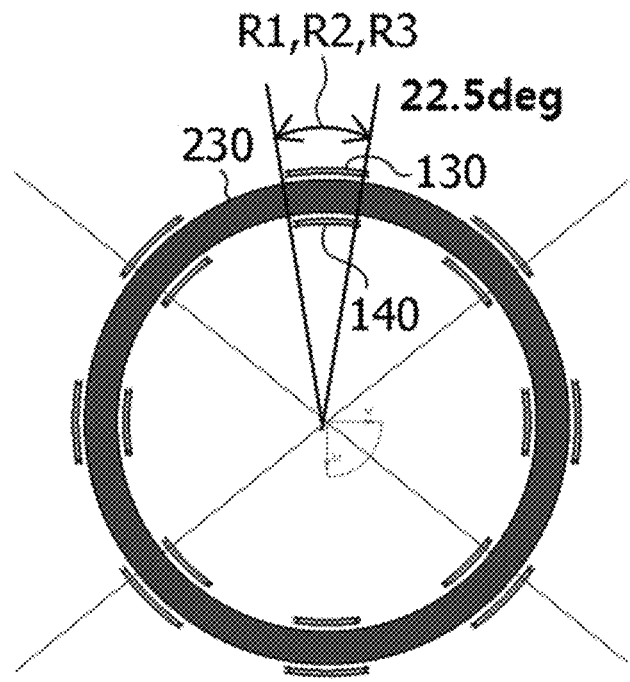
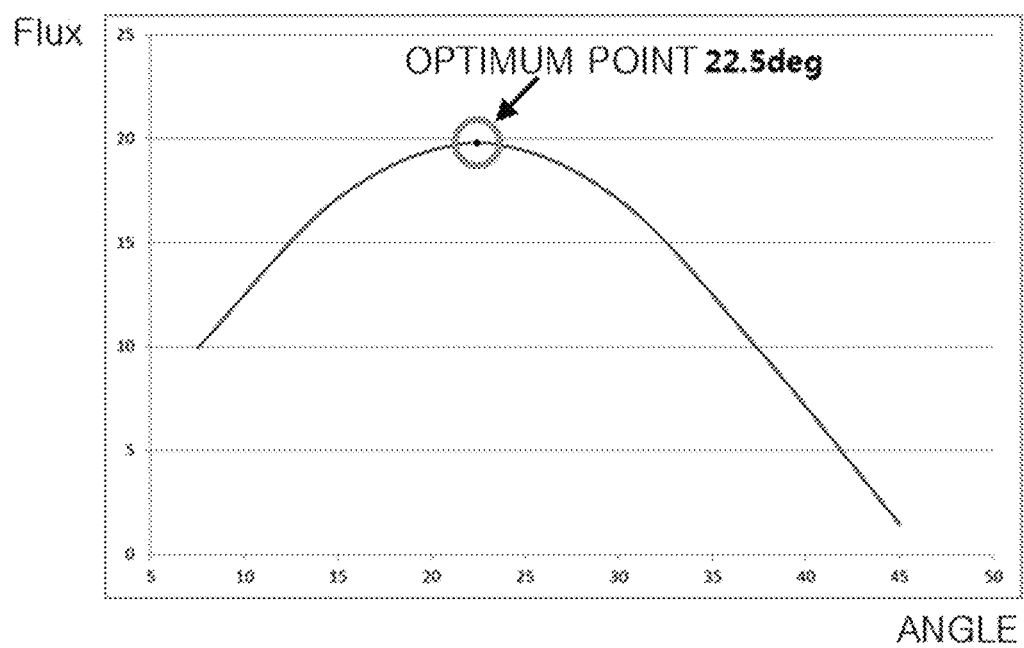

[FIG. 21]
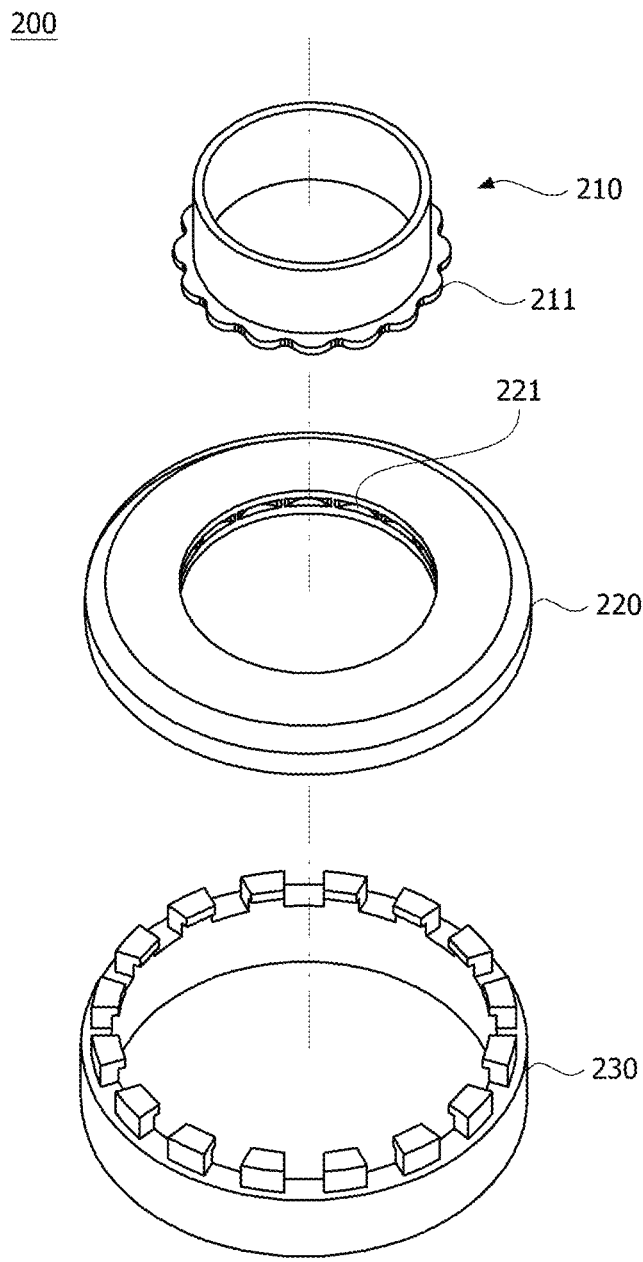

[FIG. 22]
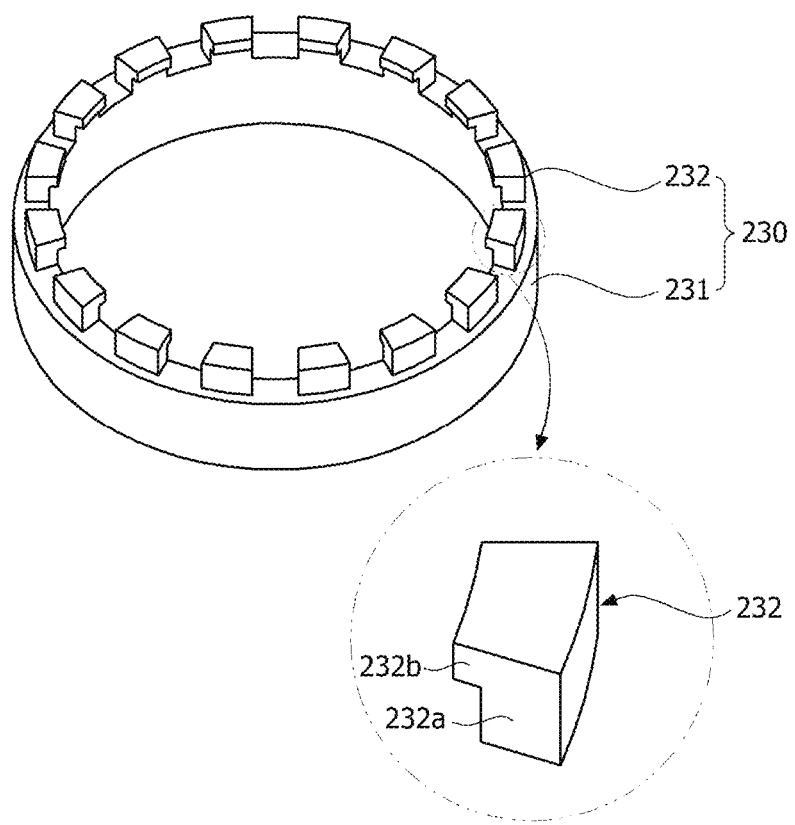

[FIG. 23]
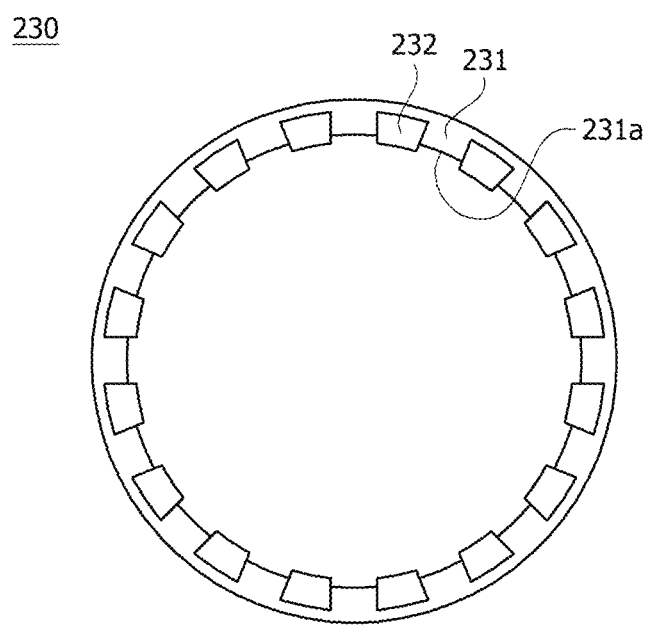

[FIG. 24]
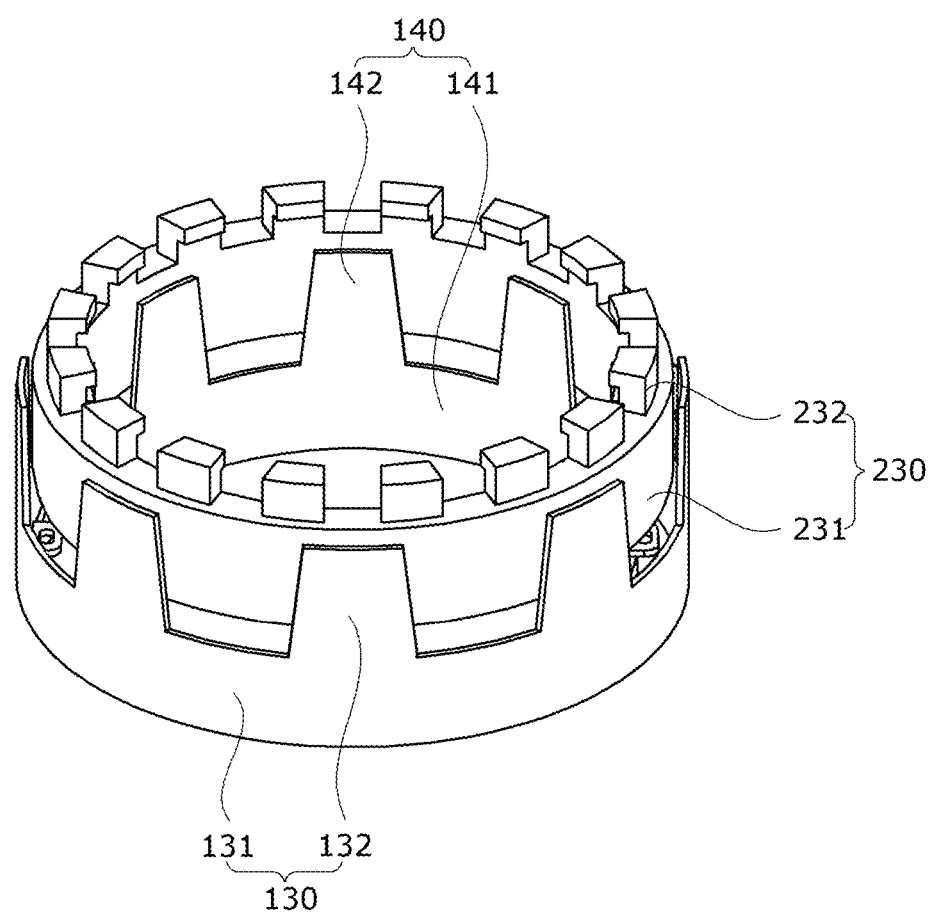

[FIG. 25]
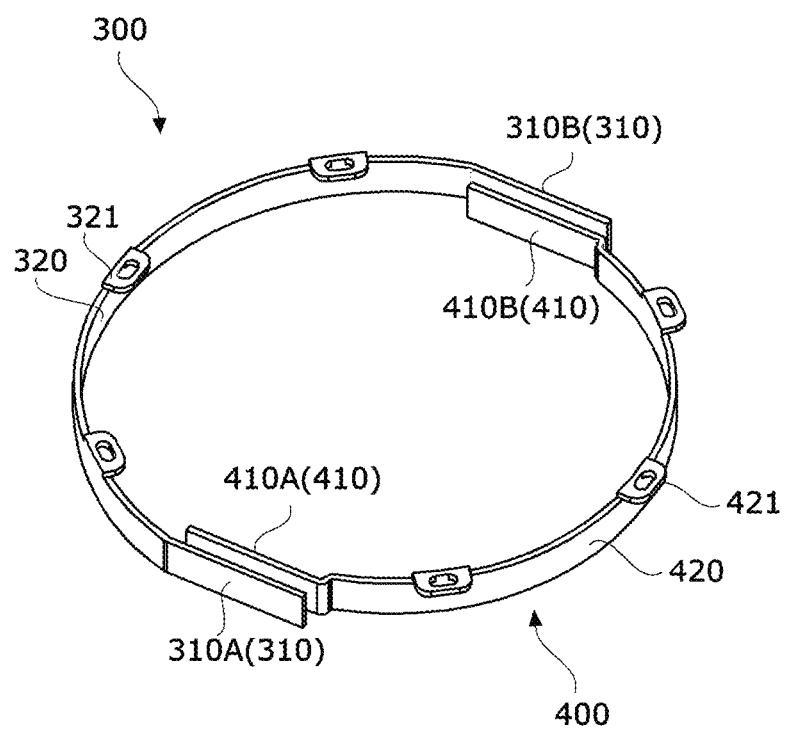

[FIG. 26]
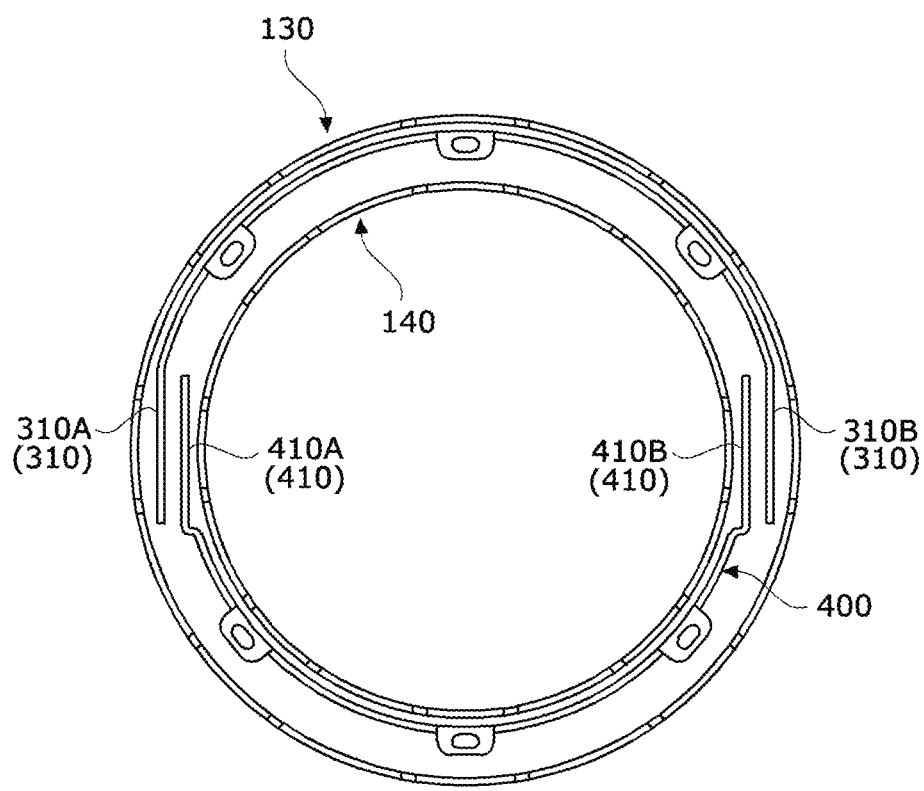

[FIG. 27]
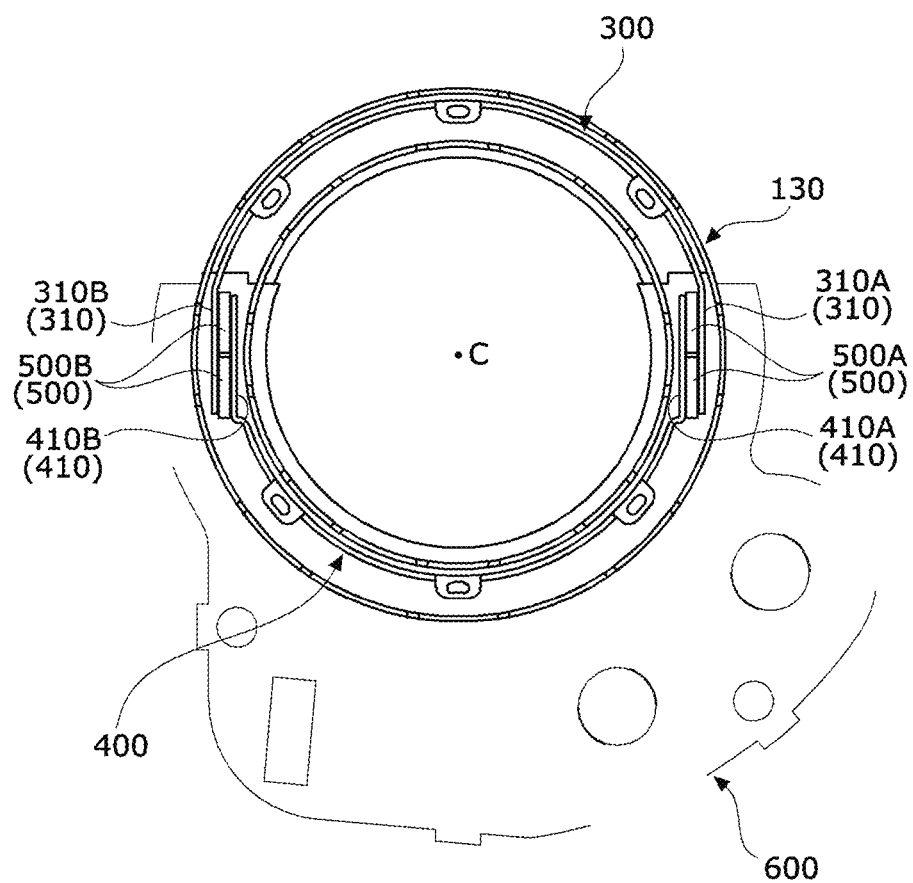

[FIG. 28]
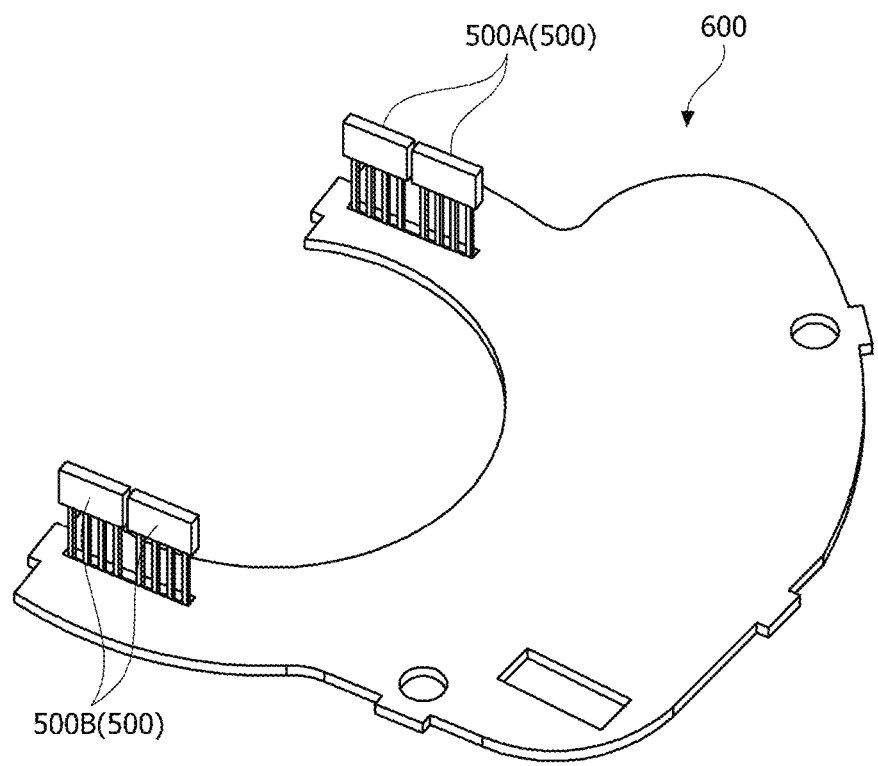

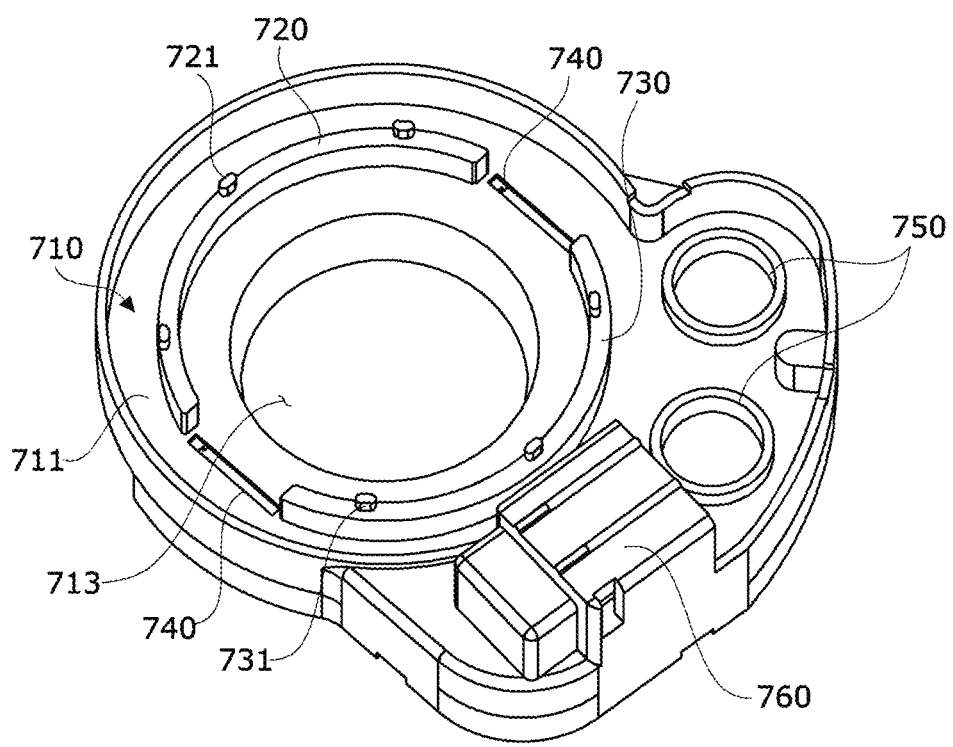
[FIG. 29]

[FIG. 30]
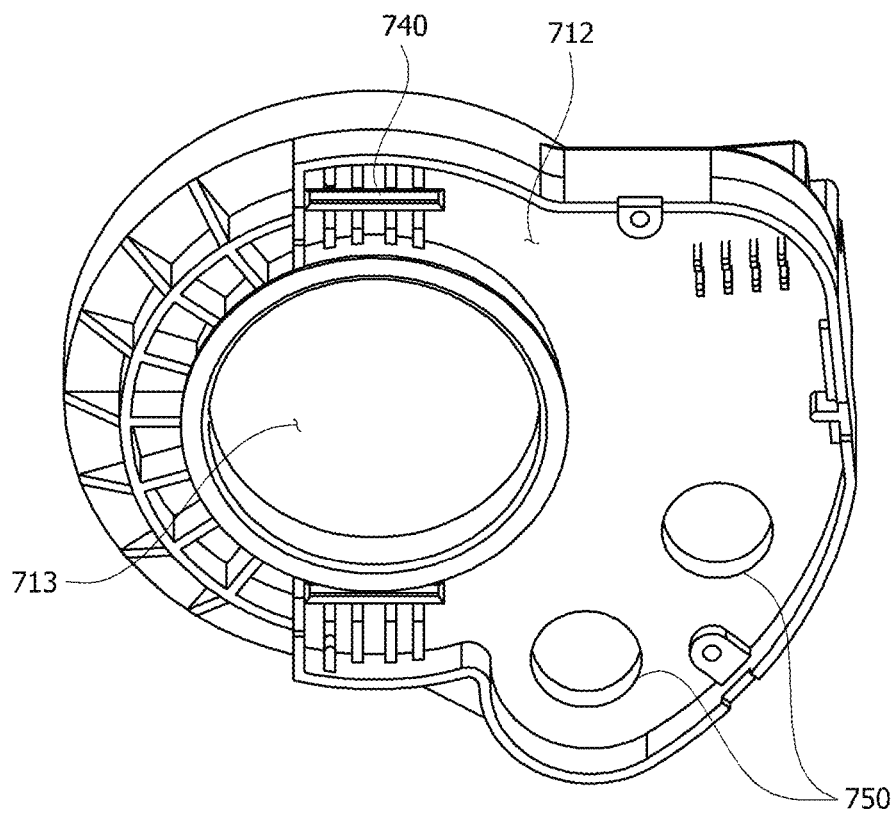

[FIG. 31]
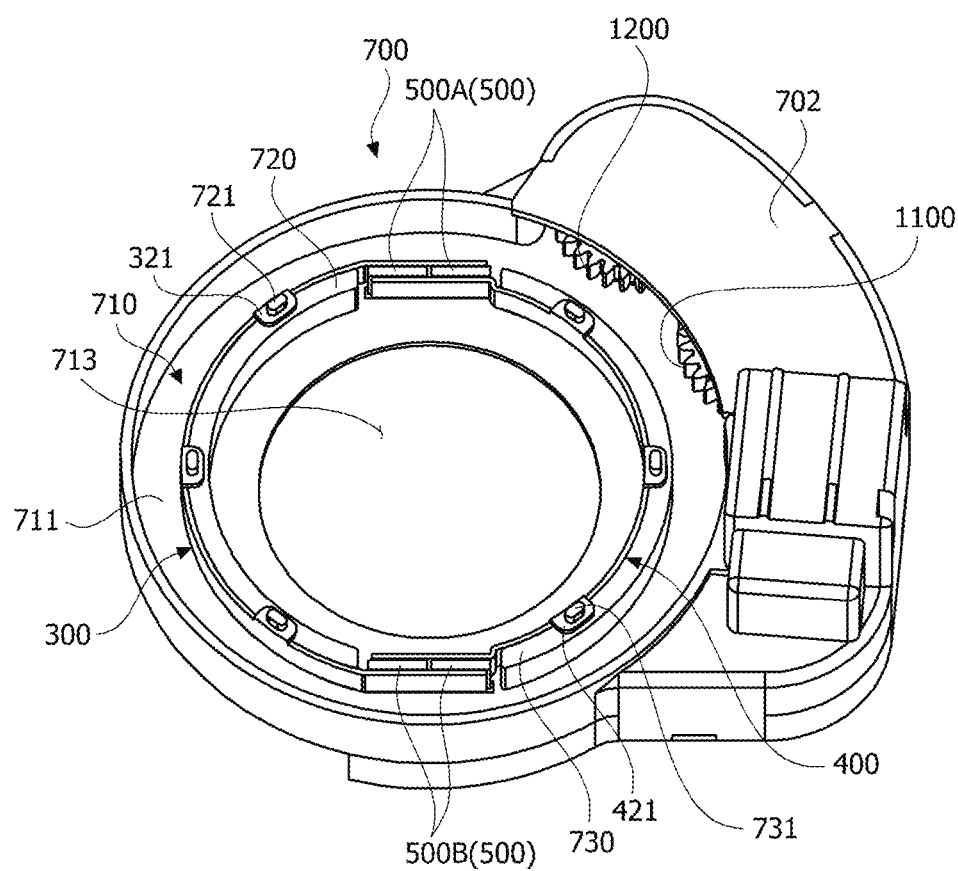

[FIG. 32]
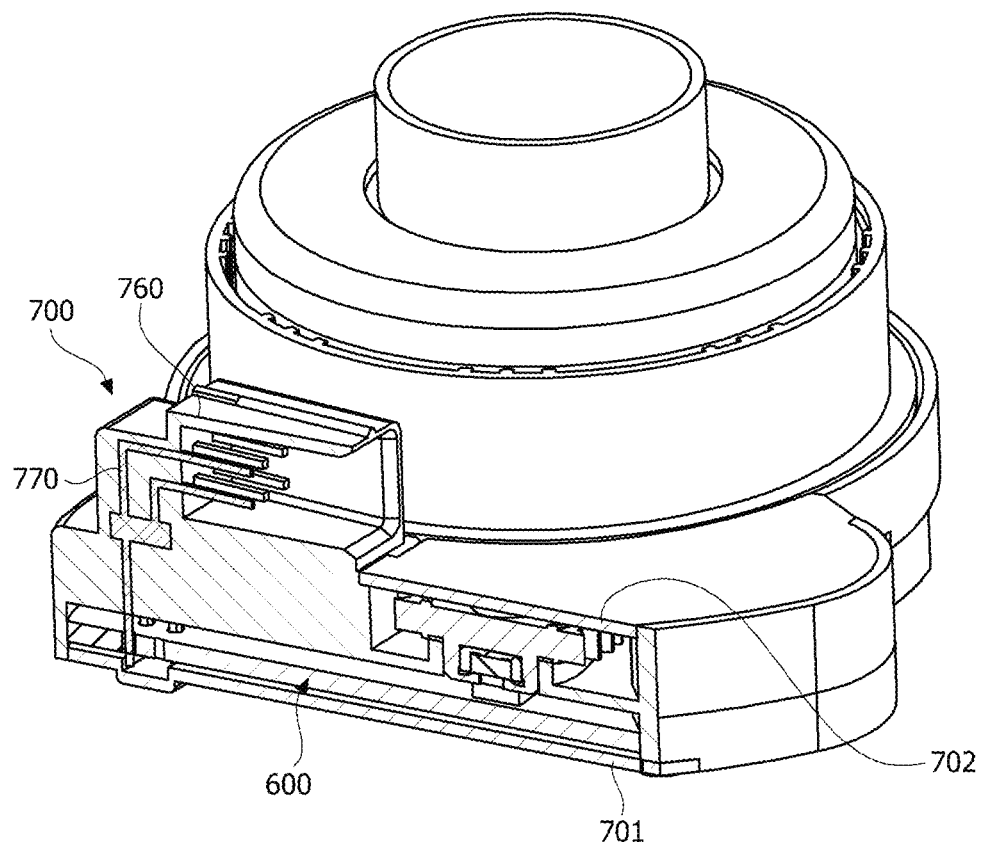

[FIG. 33]
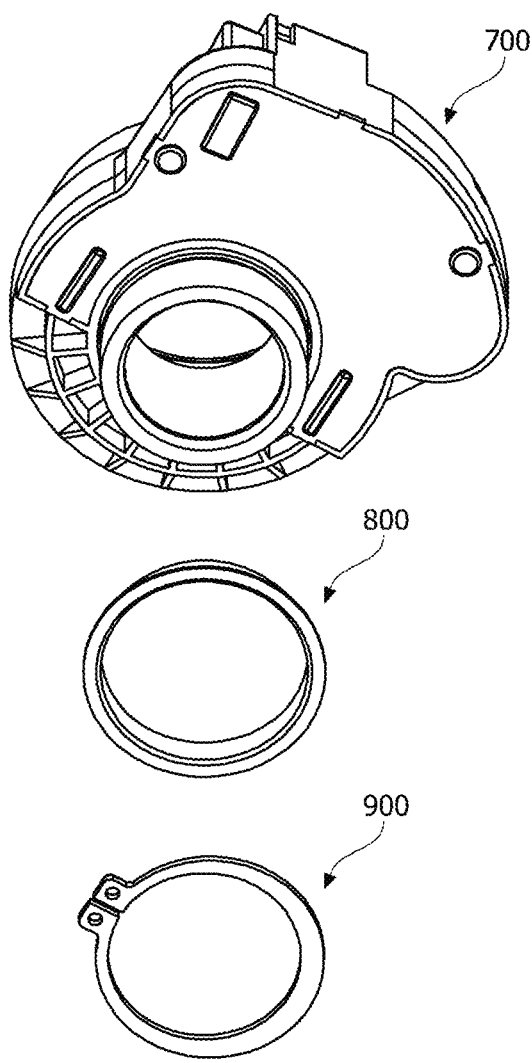

[FIG. 34]
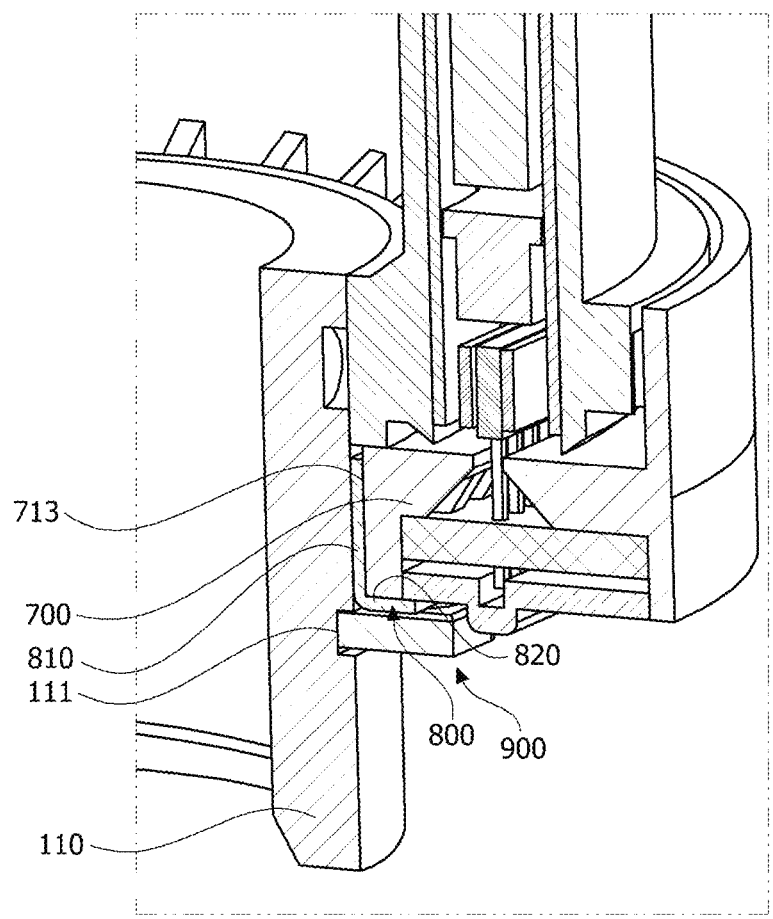

[FIG. 35]
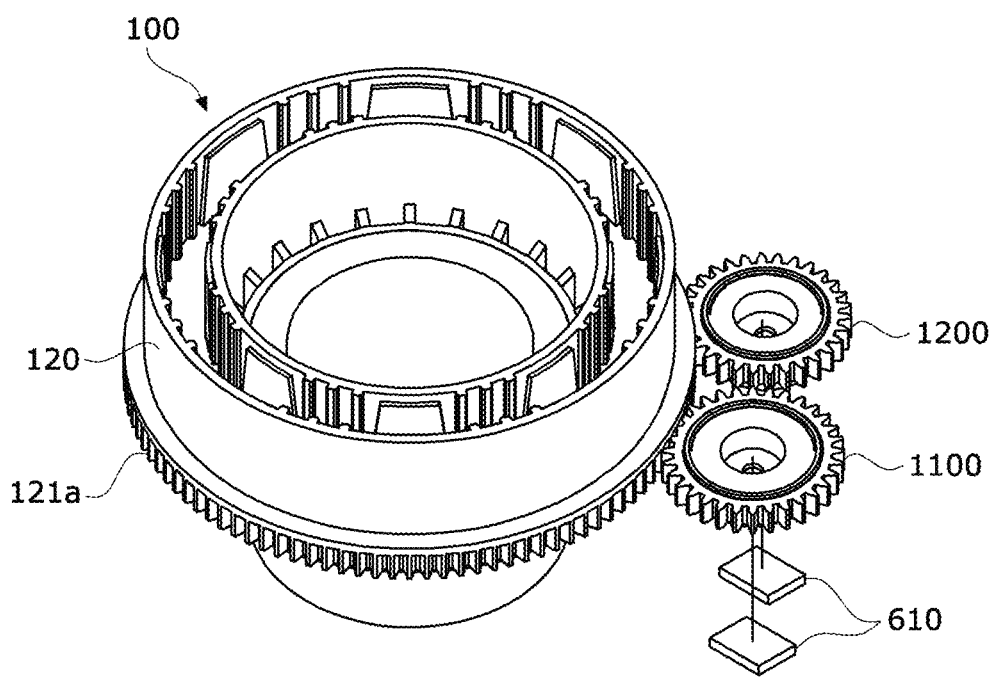

[FIG. 36]
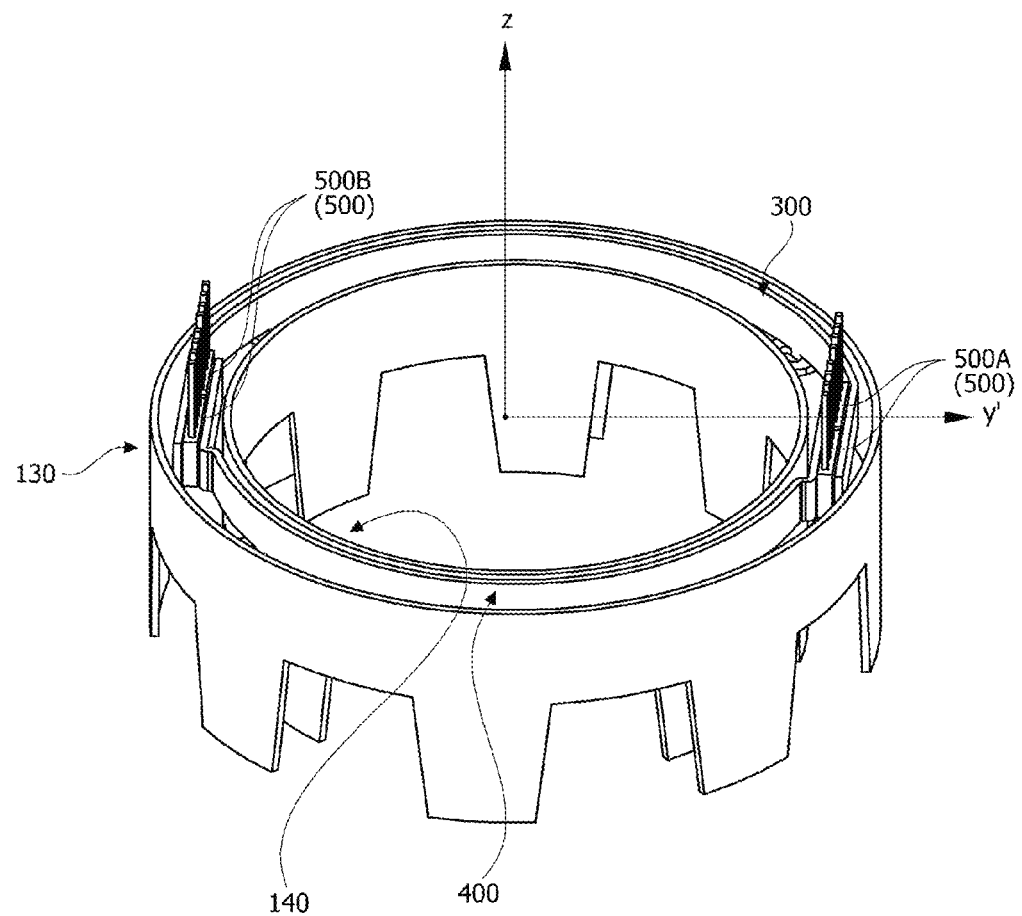

[FIG. 37]
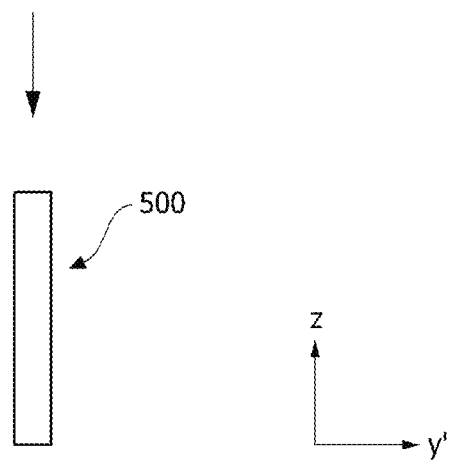

[FIG. 38]
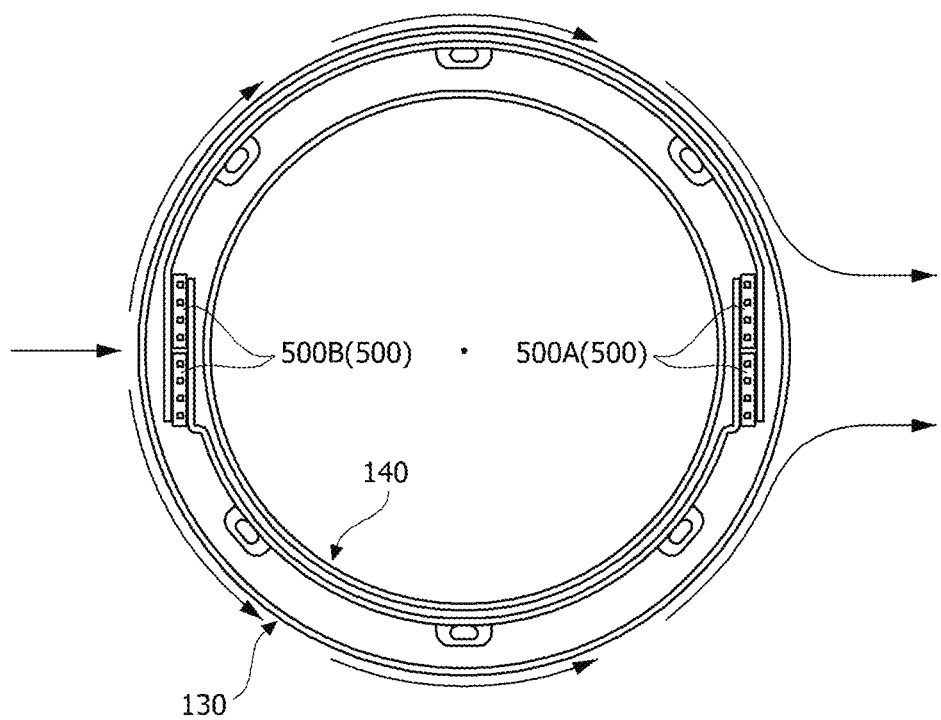

[FIG. 39]
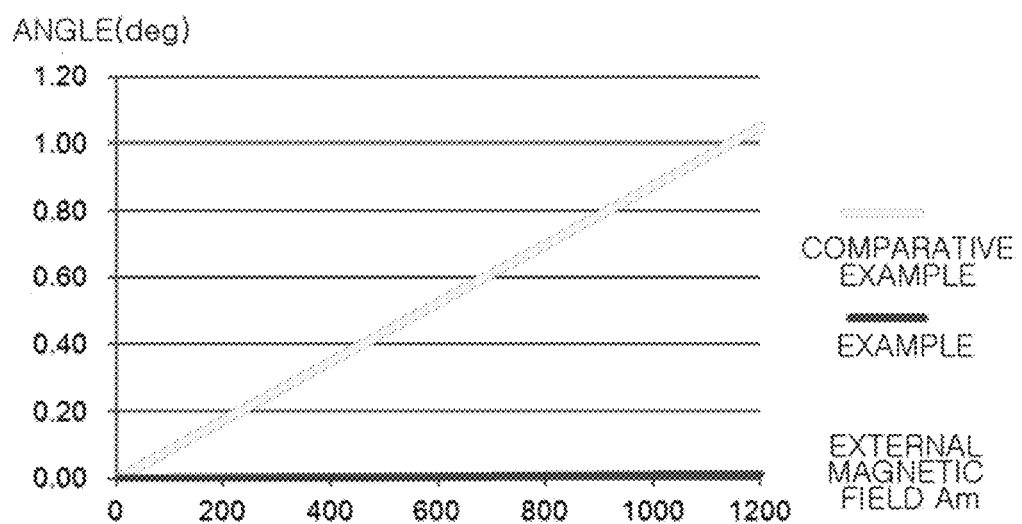

[FIG. 40]
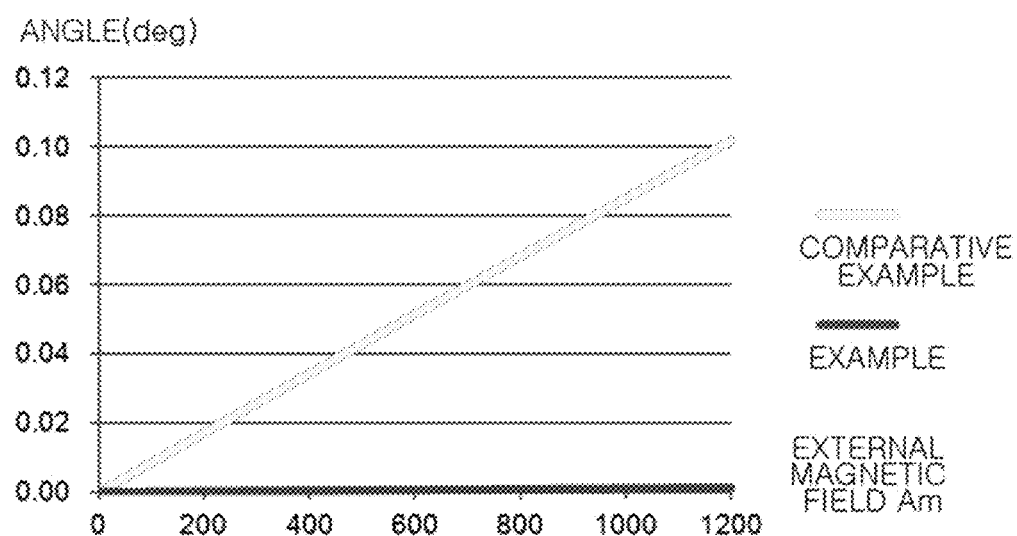

SENSING DEVICE

CROSS REFERENCE TO RELATED APPLICATIONS

This application is the National Phase of PCI International Application No. PCT/KR2019/010682, filed on Aug. 22, 2019, which claims priority under 35 U.S.C. 119(a) to Patent Application Nos. 10-2018-0098735, tiled in the Republic of Korea on Aug. 23, 2018 and 10-2018-0098776, filed in the Republic of Korea on Aug. 23, 2018, all of which are hereby expressly incorporated by reference into the present application.

TECHNICAL FIELD

The present invention relates to a sensing device.

BACKGROUND ART

In an electronic power steering (EPS) system, an electronic control unit drives a motor according to driving conditions to secure turning stability and provide quick reinforcing force so that a driver can stably travel.

An EPS system includes a sensor assembly configured to measure a torque, a steering angle, and the like of a steering shaft to provide a proper torque. The sensor assembly may include a torque sensor configured to measure a torque applied to the steering shaft and an index sensor configured to measure an angular acceleration of the steering shaft. In addition, the steering shaft may include an input shaft connected to a handle, an output shaft connected to a power transmission structure at a side of a wheel, and a torsion bar which connects the input shaft and the output shaft.

The torque sensor measures a torsion degree of the torsion bar to measure a torque applied to the steering shaft. In addition, the index sensor detects rotation of the output shaft to measure an angular acceleration of the steering shaft. In the sensor assembly, the torque sensor and the index sensor may be disposed to be integrally formed.

The torque sensor may include a housing, a rotor, a stator including a stator tooth, and a collector and measure the torque.

In this case, the torque sensor may have a magnetic type structure in which the collector is provided to be disposed outside the stator tooth.

However, when an external magnetic field is generated, since the collector serves as a passage of the magnetic field in the structure, there is a problem in that the collector affects a magnetic flux value of a Hall integrated circuit (IC). Accordingly, a problem occurs in that an output value of the torque sensor is changed and thus the torsion degree of the torsion bar cannot be measured accurately.

Particularly, since many electric devices are used in a vehicle, a torque sensor is frequently affected by an external magnetic field, and thus there is a need for a torque sensor which is not affected by an external magnetic field.

Technical Problem

The present invention is directed to providing a sensing device capable of avoiding magnetic interference of an external magnetic field generated from the outside when a torque is measured.

Specifically, the present invention is directed to providing a sensing device in which a collector is disposed between stator teeth to prevent the collector from serving as a passage of external magnetic fields.

In addition, the present invention is directed to providing a sensing device in which a magnet is rotatably disposed between stator teeth to charge the stator teeth.

In addition, the present invention is directed to providing a sensing device in which a stator is not separated from a housing.

In addition, the present invention is directed to providing a sensing device in which coaxial driving of a stator is secured.

Objectives to be solved by embodiments are not limited to the above-described objectives, and other objectives which are not described above will be clearly understood by those skilled in the art from the following specification.

Technical Solution

One aspect of the present invention provides a sensing device including a stator including a stator tooth and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction from a center of the stator, the stator includes a stator holder and a stator body which is coupled to the stator holder and on which the first stator tooth and the second stator tooth are disposed, a the stator body includes a protrusion, and the protrusion is in contact with a lower end of the first stator tooth or a lower end of the second stator tooth.

Another aspect of the present invention provides a sensing device including a stator including a stator tooth and a rotor including a magnet, wherein the stator tooth includes a first stator tooth having a first radius and a second stator tooth having a second radius, the first stator tooth includes a plurality of first teeth, the second stator tooth includes a plurality of second teeth, the first tooth overlaps the second tooth in a radial direction from a center of the stator, the stator includes a stator holder and a stator body which is coupled to the stator holder and on which the first stator tooth and the second stator tooth are disposed, the stator body includes a protrusion, and the protrusion is in contact with a lower end of the first stator tooth or a lower end of the second stator tooth.

Still another aspect of the present invention provides a sensing device including a stator and a rotor of which at least a portion is disposed in the stator, wherein the stator includes a stator holder, a stator body coupled to the stator holder, a first stator tooth disposed on the stator body, and a second stator tooth having a radius which is greater than a radius of the first stator tooth, the first stator tooth includes a first body and a plurality of first teeth connected to the first body and spaced apart from each other, the second stator tooth includes a second body and a plurality of second teeth connected to the second body and spaced apart from each other, the plurality of first teeth and the plurality of second teeth overlap in a radial direction, the stator body includes a protrusion, and the protrusion is in contact with a lower end of the first body or a lower end of the second body.

The stator body may include an inner part, an outer part, and a partition plate connecting the inner part and the outer part, wherein the protrusion may include a first protrusion and a second protrusion, the first protrusion may protrude from a lower end of the inner part and may be in contact with a lower end of the first stator tooth, and the second protrusion may protrude from a lower end of the outer part and may be in contact with the lower end of the first stator tooth.

The stator body may include the inner part, the outer part, and the partition plate connecting the inner part and the outer part, and the partition plate may include a first hole through which a first tooth of the first stator tooth passes and a second hole through which a second tooth of the second stator tooth passes.

A width of a lower end of the first tooth may be greater than a width of an upper end of the first tooth.

A width of the first hole may be smaller than the width of the lower end of the first tooth and greater than the width of the upper end, and a width of the second hole may be smaller than a width of a lower end of the second tooth and greater than a width of an upper end of the second tooth.

The sensing device may include a housing and a sub-gear disposed in the housing, the stator may include a main gear engaged with the sub-gear, and the main gear may be disposed on an outer circumferential surface of the stator body.

Yet another aspect of the present invention provides a sensing device including a stator including a stator tooth and a stator holder, a rotor including a magnet, and a housing disposed outside the stator holder, wherein the stator tooth includes a first stator tooth and a second stator tooth disposed inside the first stator tooth, the first stator tooth includes a plurality of first teeth, the second stator tooth includes a plurality of second teeth, and the first tooth overlaps the second tooth in a radial direction from a center of the stator, and the sensing device further includes a first member, wherein the first member is disposed between the housing and the stator holder.

Yet another aspect of the present invention provides a sensing device including a stator including a stator tooth and a stator holder, a rotor including a magnet, and a housing disposed outside the stator holder, wherein the stator tooth includes a first stator tooth having a first radius and a second stator tooth having a second radius, wherein the first stator tooth includes a plurality of first teeth, the second stator tooth includes a plurality of second teeth, and the first tooth overlaps the second tooth in a radial direction from a center of the stator, and the sensing device further includes a first member, wherein the first member is disposed between the housing and the stator holder.

Yet another aspect of the present invention provides a sensing device including a stator and a rotor of which at least a portion is disposed in the stator, wherein the stator includes a stator holder, a stator body coupled to the stator holder, a first stator tooth disposed on the stator body, and a second stator tooth having a radius which is greater than a radius of the first stator tooth, the first stator tooth includes a first body and a plurality of first teeth connected to the first body and spaced apart from each other, the second stator tooth includes a second body and a plurality of second teeth connected to the second body and spaced apart from each other, and the plurality of first teeth and the plurality of second teeth overlap in a radial direction, and the sensing device further includes a housing disposed outside the stator holder and a first member, wherein the first member is disposed between the housing and the stator holder.

The sensing device may further include a second member coupled to the stator holder, wherein the second member may be disposed under the housing to overlap the housing in an axial direction.

The second member may be disposed under the first member, and an upper surface of the second member may be in contact with the first member.

The housing may include a hole through which the stator holder passes, and the first member may be disposed inside the hole.

The first member may include a body having a ring shape and a flange part extending from the body in the radial direction, wherein an outer circumferential surface of the body is in contact with an inner wall of the hole, and an upper surface of the flange part may be in contact with a lower surface of the housing.

Yet another aspect of the present invention provides a sensing device including a stator including a stator tooth and a stator holder, a rotor including a magnet, and a housing disposed outside the stator holder, wherein the stator tooth includes a first stator tooth and a second stator tooth disposed inside the first stator tooth, the first stator tooth includes a plurality of first teeth, the second stator tooth includes a plurality of second teeth, and the first tooth overlaps the second tooth in a radial direction from a center of the stator, and the sensing device further includes a second member coupled to the stator holder, wherein the second member is disposed under the housing to overlap the housing in an axial direction Yet another aspect of the present invention provides a sensing device including a stator including a stator tooth and a stator holder, a rotor including a magnet, and a housing disposed outside the stator holder, wherein the stator tooth includes a first stator tooth having a first radius and a second stator tooth having a second radius, the first stator tooth includes a plurality of first teeth, the second stator tooth includes a plurality of second teeth, and the first tooth overlaps the second tooth in a radial direction from a center of the stator, and the sensing device further includes a second member coupled to the stator holder, wherein the second member is disposed under the housing to overlap the housing in an axial direction.

Yet another aspect of the present invention provides a sensing device including a stator and a rotor of which at least a portion is disposed in the stator, wherein the stator includes a stator holder, a stator body coupled to the stator holder, a first stator tooth disposed on the stator body, and a second stator tooth having a radius which is greater than a radius of the first stator tooth, the first stator tooth includes a first body and a plurality of first teeth connected to the first body and spaced apart from each other, the second stator tooth includes a second body and a plurality of second teeth connected the second body and spaced apart from each other, and the plurality of first teeth and the plurality of second teeth overlap in a radial direction, and the sensing device further includes a second member coupled to the stator holder, wherein the second member is disposed under the housing to overlap the housing in an axial direction.

The stator holder may include a groove, wherein the groove may be disposed along an outer circumferential surface of the stator holder, and the second member may be a member having a ring shape and disposed in the groove.

Advantageous Effects

In a sensing device according to embodiments having the above-described structure, since a pair of collectors are disposed between a pair of stator teeth and sensors are disposed between the collectors, when a torque is measured, magnetic interference of an external magnetic field generated from the outside can be prevented or minimized.

Since a first tooth of a first stator tooth and a second tooth of a second stator tooth are disposed to overlap in a radial direction and a magnet is rotated between the first tooth and the second tooth, the first tooth and the second tooth can be charged in different poles.

There is an advantage of increasing a magnitude of a collected flux.

There is an advantage of easily coupling the stator tooth to a stator body.

There is an advantage of easily coupling the collector to a housing.

There is an advantage of preventing a stator from being separated from the housing.

There is an advantage of preventing the housing from being worn due to friction between the stator holder and a hole of the housing so that coaxial rotation of the stator is secured.

Various and useful advantages and effects of the embodiments are not limited to the above-described contents and will be more easily understood from descriptions of the specific embodiments.

DESCRIPTION OF DRAWINGS

FIG. 1 is a perspective view illustrating a sensing device according to an embodiment.

FIG. 2 is an exploded perspective view illustrating the sensing device illustrated in FIG. 1.

FIG. 3 is a cross-sectional perspective view illustrating the sensing device taken along line A-A of FIG. 1.

FIG. 4 is a perspective view illustrating a stator of the sensing device according to the embodiment.

FIG. 5 is an exploded perspective view illustrating the stator of the sensing device according to the embodiment.

FIG. 6 is a cross-sectional view illustrating the stator of the sensing device according to the embodiment.

FIG. 7 is a perspective view illustrating a stator body of the stator.

FIG. 8 is a plan view illustrating the stator body of the stator.

FIG. 9 is a cross-sectional view illustrating the stator body of the stator.

FIG. 10 is a view illustrating coupling of a first stator tooth and a second stator tooth and the stator body.

FIG. 11 is a view illustrating a state in which a first tooth is inserted into a first hole.

FIG. 12 is a view illustrating a protrusion of the stator body for fixing first and second bodies.

FIG. 13 is a view illustrating a fusing process of the protrusion of the stator body.

FIG. 14 is a side view illustrating the first stator tooth.

FIG. 15 is a side view illustrating the second stator tooth.

FIG. 16 is a plan view illustrating the first stator tooth, the second stator tooth, and a magnet.

FIG. 17 is a view illustrating a first pole and a second pole of the magnet.

FIG. 18 is a view illustrating a second angle.

FIG. 19 is a view illustrating a third angle.

FIG. 20 is a graph showing a flux with respect to a first angle, the second angle, and the third angle.

FIG. 21 is an exploded perspective view illustrating a rotor.

FIG. 22 is a view illustrating the magnet.

FIG. 23 is a plan view illustrating the magnet.

FIG. 24 is a perspective view illustrating an arrangement of the magnet with respect to the first stator tooth and the second stator tooth.

FIG. 25 is a view illustrating collectors.

FIG. 26 is a view illustrating the collectors disposed between the first stator tooth and the second stator tooth.

FIG. 27 is a view illustrating positions of sensors and positions of the collectors.

FIG. 28 is a view illustrating a circuit substrate.

FIG. 29 is a perspective view illustrating a housing when viewed from above.

FIG. 30 is a perspective view illustrating the housing when viewed from below.

FIG. 31 is a view illustrating the housing in which the collectors and the sensors are disposed.

FIG. 32 is a cross-sectional view illustrating a connector housing and a pin of the housing.

FIG. 33 is a view illustrating a first member and a second member.

FIG. 34 is a view illustrating the first member and the second member installed in a stator holder.

FIG. 35 is a view illustrating a first gear and a second gear which are engaged with a main gear.

FIG. 36 is a view illustrating a directionality of an external magnetic field with respect to the stator tooth.

FIG. 37 is a view illustrating a state in which the sensor avoids an external magnetic field having a z-axis directionality.

FIG. 38 is a view illustrating a state in which the first and second stator teeth avoid an external magnetic field having a y'-axis directionality.

FIG. 39 is a graph showing a comparison of an amount of change in angle corresponding to an external magnetic field in a z-axis direction between a comparative example and an example.

FIG. 40 is a graph showing a comparison of an amount of change in angle corresponding to the external magnetic field in a y'-axis direction between the comparative example and the example.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a perspective view illustrating a sensing device according to an embodiment, FIG. 2 is an exploded perspective view illustrating the sensing device illustrated in FIG. 1, and FIG. 3 is a cross-sectional perspective view illustrating the sensing device taken along line A-A of FIG. 1. In FIGS. 1 and 2, a z-direction denotes an axial direction, and a y-direction denotes a radial direction. In addition, the axial direction is perpendicular to the radial direction.

Referring to FIGS. 1 to 3, a sensing device 1 according to the embodiment may include a stator 100, a rotor 200 of which one portion is disposed in the stator 100, a first collector 300 disposed in the stator 100, a second collector 400 disposed to be spaced apart from the first collector 300 in the radial direction in the stator 100, sensors 500 disposed between the first collector 300 and the second collector 400, a circuit substrate 600 electrically connected to the sensors 500, a housing 700 coupled to the circuit substrate 600, a first member 800, and a second member 900.

In this case, the stator 100 may be connected to an output shaft (not shown), and the rotor 200 of which at least one portion is rotatably disposed in the stator 100 may be connected to an input shaft (not shown) but is not necessarily limited thereto.

In this case, the rotor 200 may be rotatably disposed with respect to the stator 100. In addition, the second collector 400 may be disposed inside the first collector 300 in the radial direction. In this case, the term "inside" may denote a direction of being disposed toward a center C in the radial direction, and the term "outside" may denote a direction opposite to "inside".

FIG. 4 is a perspective view illustrating the stator of the sensing device according to the embodiment, FIG. 5 is an exploded perspective view illustrating the stator of the sensing device according to the embodiment, and FIG. 6 is a cross-sectional view illustrating the stator of the sensing device according to the embodiment.

The stator 100 may be connected to the output shaft (not shown) of a steering shaft.

Referring to FIGS. 4 to 6, the stator 100 may include a stator holder 110, a stator body 120, a first stator tooth 130, and a second stator tooth 140.

The stator holder 110 may be connected to an output shaft of an electric steering system. Accordingly, the stator holder 110 may rotate in conjunction with rotation of the output shaft. The stator holder 110 may be formed in a cylindrical shape. In addition, the stator holder 110 may be formed of a metal material but is not necessarily limited thereto, and the stator holder 110 may also be formed of another material in consideration of a predetermined strength or more to be fixedly fitted to the output shaft.

The stator holder 110 may include a groove 111. The groove 111 is concavely formed in an outer circumferential surface of the stator holder 110. The groove 111 is disposed along the outer circumferential surface of the stator holder 110. The second member 900 (see FIG. 2) is inserted into the groove 111.

The stator holder 110 may be coupled to the stator body 120.

The stator body 120 may be disposed on an end portion of one side of the stator holder 110. The stator body 120 may be coupled to the stator holder 110 through an insert-injection method using a synthetic resin like a resin. A main gear 121 may be formed in an outer circumferential surface of the stator body 120. The main gear 121 transmits a torque of the stator 100 to a first gear 1100 and a second gear 1200.

The first stator tooth 130 and the second stator tooth 140 may be disposed to be spaced apart from each other in the radial direction. In addition, the first stator tooth 130 and the second stator tooth 140 may be fixed to the stator body 120. The first stator tooth 130 includes a first body 131 and first tooth 132. The second stator tooth 140 includes a second body 141 and second tooth 142.

FIG. 7 is a perspective view illustrating the stator body of the stator, FIG. 8 is a plan view illustrating the stator body of the stator, and FIG. 9 is a cross-sectional view illustrating the stator body of the stator.

Referring to FIGS. 7 to 9, the stator body 120 includes an inner part 121, an outer part 122, and a partition plate 123. Each of the inner part 121 and the outer part 122 has a cylindrical shape. The outer part 122 is disposed to be spaced outward from the inner part 121 in the radial direction. The partition plate 123 connects the inner part 121 and the outer part 122. The inner part 121, the outer part 122, and the partition plate 123 may be integrally formed. The stator holder 110 may be coupled to an inner side of the inner part 121. A space S may be formed between the outer part 122 and the inner part 121. The partition plate 123 may be formed in a plate shape. The partition plate 123 may be disposed between the inner part 121 and the outer part 122.

As illustrated in FIG. 9, the space S may be divided into a first space S1 and a second space S2 by the partition plate 123. A magnet 230 may be disposed in the first space S1, and the sensors 500 may be disposed in the second space S2. The partition plate 123 may be disposed under a reference line L1, and the reference line L1 is a virtual horizontal line passing through a center of the outer part 122 in the axial direction.

Meanwhile, the partition plate 123 may include first holes 124 and second holes 125. The first holes 124 and the second holes 125 are for arranging the first stator tooth 130 and the second stator tooth 140.

Referring to FIG. 6, the first body 131 and the second body 141 may be disposed in the first space S1. The first tooth 132 and the second tooth 142 may be disposed in the second space S2.

The plurality of first holes 124 may be formed to be spaced apart from each other in a circumferential direction. In addition, the first tooth 132 is disposed in the second space S2 by passing through the first holes 124. In this case, the number of the first holes 124 is the same as the number of first teeth 132. The first hole 124 may be disposed close to an inner circumferential surface of the outer part 122. As illustrated in FIG. 8, the first hole 124 may be formed in the partition plate 123 to be in contact with the inner circumferential surface of the outer part 122.

The plurality of second holes 125 may be formed to be spaced apart from each other in the circumferential direction. In this case, the second hole 125 may be disposed to be spaced outward from the first hole 124 in the radial direction. In addition, the second tooth 142 is disposed in the second space S2 by passing through the second holes 125. In this case, the number of the second holes 125 is the same as the number of second teeth 142 of the second stator tooth 140. The second hole 125 may be disposed close to an outer circumferential surface of the inner part 121. As illustrated in FIG. 8, the second hole 125 may be formed in the partition plate 123 to be in contact with the outer circumferential surface of the inner part 121.

The first stator tooth 130 and the second stator tooth 140 may be disposed between the outer circumferential surface of the inner part 121 and the inner circumferential surface of the outer part 122 of the stator body 120. In this case, each of the first stator tooth 130 and the second stator tooth 140 may be formed of a metal material to be charged by rotation of the magnet 230.

In addition, the first stator tooth 130 may be fixed to the inner circumferential surface of the outer part 122 by an adhesive member (not shown) such as a glue, and the second stator tooth 140 may be fixed to the outer circumferential surface of the inner part 121 by an adhesive member (not shown) such as a glue but are not necessarily limited thereto. For example, the first stator tooth 130 and the second stator tooth 140 may be fixed to the stator body 120 by coupling members (not shown), through caulking methods, or the like.

FIG. 10 is a view illustrating coupling of the first stator tooth and the second stator tooth and the stator body.

Referring to FIGS. 9 and 10, a boss 129 is disposed to extend downward from the partition plate 123. A sidewall of the boss 129 and the outer part 122 are spaced apart from each other to form a first slot U1. The first tooth 132 is inserted into the first slot U1 and passes through the first hole 124 to be positioned in the second space S2. In addition, another sidewall of the boss 129 and the inner part 121 are spaced apart from each other to form a second slot U2. The second tooth 142 is inserted into the second slot U2 and passes through the second hole 125 to be positioned in the second space S2.

In a process in which the first stator tooth 130 is coupled to the stator body 120, the first slot U1 guides the first tooth 132 to the first hole 124 so that the first stator tooth 130 is easily coupled to the stator body 120.

In a process in which the second stator tooth 140 is coupled to the stator body 120, the second slot U2 guides the first tooth 132 to the second hole 125 so that the second stator tooth 130 is easily coupled to the stator body 120.

FIG. 11 is a view illustrating a state in which the first tooth is inserted into the first hole.

Referring to FIG. 11, in the first tooth 132, a width W2 of a lower surface in the circumferential direction is greater than a width W1 of an upper surface in the circumferential direction. In this case, the lower surface is a surface adjacent to the first body 131, and the upper surface is a surface opposite to the lower surface. When viewed from the front, the first tooth 132 may have a trapezoidal shape. Such a shape of the first tooth 132 is for inducing a difference in magnetic flux density to guide a magnetic flux to flow toward the first body 131 and also for increasing a coupling force between the first stator tooth 130 and the stator body 120.

In addition, a width W3 of the first hole 214 may be greater than the width W1 of the upper surface of the first tooth 132 in the circumferential direction and smaller than the width W2 of the lower surface of the first tooth 132 in the circumferential direction. This is for fitting the first tooth 132 into the first hole 214. While the first tooth 132 is inserted into the first hole 124 toward the second space S2, a side surface of the first tooth 132 is inserted into the first hole 124 along an inner wall of the first hole 124. In this process, the side surface of the first tooth 132 is press-fitted to the inner wall of the first hole 124 so that a coupling force is increased.

Meanwhile, an upper surface of the first body 131 may be in contact with a lower surface of the partition plate 123.

Although not illustrated in the drawing, the second tooth 142 and the second hole 125 may also be coupled through a method which is the same as the above-described method that the first tooth 132 is coupled to the first hole 124.

FIG. 12 is a view illustrating a protrusion of the stator body for fixing the first and second bodies, and FIG. 13 is a view illustrating a fusing process of the protrusion of the stator body.

In FIG. 13, a symbol "I" denotes an inward direction toward a center of the stator, and in FIG. 13, a symbol "O" denotes an outward direction opposite to the inward direction.

Referring to FIGS. 12 and 13, the stator body 120 includes a first protrusion 126 and a second protrusion 127. The first protrusion 126 is disposed to protrude from a lower end of the inner part 121 in the axial direction. The first protrusion 126 is disposed along the inner part 121 having an annular shape. The second protrusion 127 is disposed to protrude from a lower end of the outer part 122 in the axial direction. The second protrusion 127 is disposed along the outer part 122 having an annular shape.

The first protrusion 126 has an outer circumferential surface 126a and an inner circumferential surface 126b. The inner circumferential surface 126b is continuous with an inner wall of the outer part 122. The outer circumferential surface 126a may be inclined with respect to the inner circumferential surface 126b. The outer circumferential surface 126a may be disposed obliquely in a direction from the lower end of the outer part 122 toward a lower end of the inner circumferential surface 126b. When fusion is in progress in the axial direction like in a direction F of FIG. 13, the first protrusion 126 is deformed to cover a lower end of the first body 131. The first protrusion 126 prevents the first stator tooth 130 from being separated from the stator body 120 in the axial direction.

The second protrusion 127 has an outer circumferential surface 127a and an inner circumferential surface 127b. The inner circumferential surface 127b is continuous with an inner wall of the inner part 121. The outer circumferential surface 127a may be inclined with respect to the inner circumferential surface 127b. The outer circumferential surface 127a may be disposed obliquely in a direction from the lower end of the inner part 121 toward a lower end of the inner circumferential surface 127b. When fusion is in progress in the axial direction like in the direction F of FIG. 13, the second protrusion 127 is deformed to cover a lower end of the second body 141. The second protrusion 127 prevents the second stator tooth 140 from being separated from the stator body 120 in the axial direction.

FIG. 14 is a side view illustrating the first stator tooth, and FIG. 15 is a side view illustrating the second stator tooth.

Referring to FIGS. 5 and 14, the first stator tooth 130 may include the first body 131 having a ring shape and a plurality of first teeth 132 spaced apart from each other and protruding from the first body 131 in the axial direction. For example, the first teeth 132 may be disposed to be spaced apart from each other in the circumferential direction and may extend upward from an upper side of the first body 131. The first body 131 and the plurality of first teeth 132 may be integrally formed. In this case, the first body 131 may be referred to as a first tooth body.

The first tooth 132 may be formed in a shape of which a lower side is wide and an upper side is narrow. For example, when the first tooth 132 is viewed in the radial direction, a width of the lower side is greater than a width of the upper side. As illustrated in FIG. 10, the first tooth 132 may be formed in a trapezoidal shape.

In addition, since the first tooth 132 passes through the first hole 124, the upper surface of the first body 131 may be in contact with the lower surface of the partition plate 123.

Referring to FIGS. 5 and 15, the second stator tooth 140 may include the second body 141 having a ring shape and a plurality of second teeth 142 spaced apart from each other and protruding from the second body 141 in the axial direction. For example, the second teeth 142 may be disposed to be spaced apart from each other in the circumferential direction and may extend upward from an upper side of the second body 141. The second body 141 and the plurality of second teeth 142 may be integrally formed. In this case, the second body 141 may be referred to as a second tooth body.

The second tooth 142 may be formed in a shape of which a lower side is wide and an upper side is narrow. For example, when the second tooth 142 is viewed in the radial direction, in the second tooth 142, a width of the lower side is greater than a width of the upper side. As illustrated in FIG. 11, the second tooth 142 may be formed in a trapezoidal shape.

In addition, since the second tooth 142 passes through the second hole 125, an upper surface of the second body 141 may be in contact with the lower surface of the partition plate 123.

Referring to FIG. 14, a height H1 of the first body 131 is smaller than a height H2 of the first tooth 132 on the basis of an upper surface 131a of the first body 131. In addition, referring to FIG. 15, a height H3 of the second body 141 is smaller than a height H4 of the second tooth 142 on the basis of an upper surface 141a of the second body 141. In addition, the height H1 of the first body 131 may be the same as the height H3 of the second body 141, and the height H2 of the first tooth 132 may be the same as the height H4 of the second tooth 142. However, the present invention is not limited thereto, and the height H2 of the first tooth 132 may also be different from the height H4 of the second tooth 142.

FIG. 16 is a plan view illustrating the first stator tooth, the second stator tooth, and the magnet.

Referring to FIG. 16, the first stator tooth 130 is disposed outside the second stator tooth 140. In this case, based on the center C, the first stator tooth 130 may be formed to have a first radius R1, and the second stator tooth 140 may be formed to have a second radius R2. The first radius R1 is greater than the second radius R2.

When viewed in the radial direction (y-direction), the first tooth 132 and the second tooth 142 may be disposed to overlap in the radial direction. Such an arrangement of the first tooth 132 and the second tooth 142 has an effect of reducing magnetic flux leakage.

FIG. 17 is a view illustrating a first pole and a second pole of the magnet.

Referring to FIG. 17, the magnet includes first poles 230A and second poles 230B. The first pole 230A and the second pole 230B may be alternately disposed in a circumferential direction of the magnet.

The first poles 230A and the second poles 230B may respectively include N-pole areas NA and S-pole areas SA. Each of the first pole 230A and the second pole 230B may have a multilayer structure in which the N-pole area NA and the S-pole area SA are positioned at inner and outer sides thereof. In the first pole 230A, the N-pole area NA may be disposed at a relatively outer side, and the S-pole area SA may be disposed inside the N-pole area NA. In the second pole 230B, the N-pole area NA may be disposed at a relatively inner side, and the S-pole area SA may be disposed outside the N-pole area NA.

The N-pole area NA of the first pole 230A and the S-pole area SA of the second pole 230B are disposed adjacent to each other. The S-pole area SA of the first pole 230A and the N-pole area NA of the second pole 230B are disposed adjacent to each other.

When the magnet 230 rotates so that the first tooth 132 approaches the S-pole area SA and is charged with an S-pole, since the second tooth 142 approaches the N-pole area NA, the second tooth 142 is charged with an N-pole. Alternatively, when the magnet 230 rotates so that the first tooth 132 approaches the N-pole area NA and is charged with an N-pole, since the second tooth 142 approaches the S-pole area SA, the second tooth 142 is charged with an S-pole. Accordingly, the sensors 500 may measure an angle using a magnetic field applied through the first collector 300 and the second collector 400.

In the sensing device according to the embodiment, the first tooth 132 and the second tooth 142 overlap in the radial direction. Two ends of the second tooth 142 may overlap the first tooth 132. For example, positions and sizes of the first tooth 132 and the second tooth 142 may be designed so that a first angle $\Theta 1$, a second angle $\Theta 2$, and a third angle $\Theta 3$ are the same.

The first angle $\Theta 1$ denotes an angle formed by two ends of the first pole 230A based on the stator center C. For example, in a case in which there are eight first poles 230A and eight second poles 230B, the first angle $\Theta 1$ may be 22.5°.

FIG. 18 is a view illustrating the second angle $\Theta 2$.

FIG. 19 is a view illustrating the third angle $\Theta 3$.

Referring to FIGS. 17 and 18, the second angle $\Theta 2$ denotes an angel formed by two ends P1 of the first tooth 132 based on the stator center C. A reference point G used when the two ends P1 of the first tooth 132 are defined in the axial direction will be described below. The reference point G corresponds to a point, which corresponds to a middle point of a height H1 of a body 231 of the magnet 230, of the first tooth 132 when the first tooth 132 is disposed to face the body 231 of the magnet 230. The height H1 of the body 231 of the magnet 230 denotes a height between an upper surface 231a and a lower surface 231b of the magnet 230 in the axial direction. An angle $\Theta 4$ between the first tooth 132 and another first tooth 132 at the reference point G may be the same as the second angle $\Theta 2$.

Referring to FIGS. 17 and 19, the third angle $\Theta 3$ denotes an angle formed by two ends P2 of the second tooth 142 based on the stator center C. A reference point G used when the two ends P2 of the second tooth 142 are defined in the axial direction will be described below. The reference point G corresponds to a point, which corresponds to the middle point of the height H1 of the body 231 of the magnet 230, of the second tooth 142 when the second tooth 142 is disposed to face the body 231 of the magnet 230. An angle Θ5 between the second tooth 142 and another second tooth 142 at the reference point G may be the same as the third angle Θ3.

FIG. 20 is a graph showing a flux with respect to the first angle Θ1, the second angle Θ2, and the third angle Θ3.

Referring to FIG. 20, it may be seen that in a state in which the second angle Θ2 and the third angle Θ3 are set to be the same, as the second angle Θ2 and the third angle Θ3 become closer to the first angle Θ1, a flux magnitude increases, and as the second angle Θ2 and the third angle Θ3 become farther away from the first angle Θ1, the flux magnitude decreases. It may be seen that, in a case in which sizes and positions of the first tooth 132 and the second tooth 142 are arranged so that the second angle Θ2 and the third angle Θ3 are the same as the first angle Θ1, the flux magnitude of the first and second stator tooth 130 and 140 is the largest.

FIG. 21 is an exploded perspective view illustrating the rotor.

Referring to FIGS. 2 and 21, the rotor 200 may include a rotor holder 210, a rotor body 220, and the magnet 230. The rotor holder 210, the rotor body 220, and the magnet 230 may be integrally formed.

The rotor holder 210 may be connected to the input shaft of the electric steering system. Accordingly, the rotor holder 210 may be rotated in conjunction with rotation of the input shaft. The rotor holder 210 may be formed in a cylindrical shape. In addition, an end portion of the rotor holder 210 may be coupled to the rotor body 220. The rotor holder 210 may be formed of a metal material but is not necessarily limited thereto, and the rotor holder 210 may also be formed of another material in consideration of a predetermined strength or more to be fixedly fitted to the input shaft.

The rotor 200 may include a protrusion 211 of the rotor holder 210. The protrusion 211 may be disposed to extend from an outer circumferential surface of the rotor holder 210 in the radial direction.

The rotor body 220 is disposed at one side of the outer circumferential surface of the rotor holder 210. The rotor body 220 may be an annular member. A groove 221 may be disposed in an inner circumferential surface of the rotor body 220. The groove 221 is a groove into which the protrusion of the rotor holder 210 is inserted.

The magnet 230 is coupled to the rotor body 220. When the rotor holder 210 rotates, the magnet 230 is rotated in conjunction with the rotation of the rotor holder 210.

FIG. 22 is a view illustrating the magnet 230, and FIG. 23 is a plan view illustrating the magnet 230.

Referring to FIGS. 22 and 23, the magnet 230 may include the body 231 having a ring shape and a protrusion 232 protruding from an upper surface of the body 231. The protrusion 232 may be provided as a plurality of protrusions 232. The protrusion 232 may include a first part 232a and a second part 232b. The first part 232a protrudes upward from the upper surface of the body 231. The second part 232b may be disposed to protrude from the first part 232a in a radial direction of the magnet 230. The second part 232b may protrude inward further than an inner circumferential surface of the body 231. The protrusion 232 is for improving a coupling force to the rotor body 220. The first part 232a prevents slip between the rotor body 220 and the magnet 230 in a rotation direction, and the second part 232b prevents separation of the rotor body 220 and the magnet 230 in the axial direction.

FIG. 24 is a perspective view illustrating an arrangement of the magnet 230 with respect to the first stator tooth and the second stator tooth.

Referring to FIG. 24, the magnet 230 is disposed between the first tooth 132 and the second tooth 142. The body 231 of the magnet 230 is disposed to face the first tooth 132 and the second tooth 142. The protrusions 232 of the magnet 230 are disposed above the first tooth 132 and the second tooth 142.

FIG. 25 is a view illustrating the collectors, FIG. 26 is a view illustrating the collectors disposed between the first stator tooth and the second stator tooth, and FIG. 27 is a view illustrating positions of the sensors and positions of the collectors.

Referring to FIGS. 2 and 25 to 27, the collectors may include the first collector 300 and the second collector 400. The first collector 300 and the second collector 400 collect a flux of the stator 100. In this case, the first collector 300 and the second collector 400 may be formed of a metal material and disposed to be spaced apart from each other in the radial direction.

The first collector 300 may include first collector bodies 310 and a first extension 320. The first extension 320 extends from the first collector bodies 310. The first collector bodies 310 may include a first-1 collector body 310A and a first-2 collector body 310B. The first-1 collector body 310A is disposed at one side of the first extension 320. The first-2 collector body 310B is disposed at the other side of the first extension 320. Each of the first-1 collector body 310A and the first-2 collector body 310B may include a flat surface. The first extension 320 may include a curved surface having a predetermined curvature.

The second collector 400 may have second collector bodies 410 and a second extension 420. The second extension 420 extends from the second collector bodies 410. The second collector bodies 410 may include a second-1 collector body 410A and a second-2 collector body 410B. The second-1 collector body 410A is disposed at one side of the second extension 420. And the second-2 collector body 410B is disposed at the other side of the second extension 420. Each of the second-1 collector body 410A and the second-2 collector body 410B may include a flat surface. The second extension 420 may include a curved surface having a predetermined curvature.

The first-1 collector body 310A and the second-1 collector body 410A are disposed to overlap in the radial direction. The first-2 collector body 310B and the second-2 collector body 410B are disposed to overlap in the radial direction. The first extension 320 and the second extension 420 do not overlap in the radial direction.

The sensor 500 detects a change in magnetic field occurring between the stator 100 and the rotor 200. The sensor 500 may be a Hall integrated circuit (IC). The sensor 500 detects an amount of magnetization of the stator 100 which occurs due to an electric interaction between the magnet 230 of the rotor 200 and the stator 100. The sensing device 1 measures a torque on the basis of the detected amount of magnetization.

The sensors 500 may include a first sensor 500A and a second sensor 500B. The first sensor 500A and the second sensor 500B may be disposed at opposite sides around the center C of the stator.

The first sensor 500A is disposed between the first-1 collector body 310A and the second-1 collector body 410A.

The first-1 collector body 310A may be disposed outside the first sensor 500A. The second-1 collector body 410A may be disposed inside the first sensor 500A.

The second sensor 500B is disposed between the first-2 collector body 310B and the second-2 collector body 410B. The first-2 collector body 310B may be disposed outside the second sensor 500B. The second-2 collector body 410B may be disposed inside the second sensor 500B.

The first extension 320 may include a plurality of first brackets 321. The first brackets 321 may be disposed to extend inward from an upper surface of the first extension 320. The second extension 420 may include a plurality of second brackets 421. The second brackets 421 may be disposed to extend inward from an upper surface of the second extension 420. Each of the first bracket 321 and the second bracket 421 may include a hole. The first bracket 321 and the second bracket 421 are to be coupled to the housing.

FIG. 28 is a view illustrating the circuit substrate.

Referring to FIG. 28, the first sensor 500A and the second sensor 500B are disposed on the circuit substrate. The first sensor 500A and the second sensor 500B are disposed in a state in which the first sensor 500A and the second sensor 500B stand upward on the circuit substrate 600. The first sensor 500A and the second sensor 500B are disposed to face each other.

FIG. 29 is a perspective view illustrating the housing when viewed from above, and FIG. 30 is a perspective view illustrating the housing when viewed from below. Referring to FIGS. 2, 29, and 30, the housing may include a housing body 710, a first protruding part 720, a second protruding part 730, third protruding parts 721, and fourth protruding parts 731.

The housing body 710 has a plate shape which includes an upper surface and a lower surface and of which upper and lower portions are open. A hole 713 is disposed at a central portion thereof. The stator holder 110 is positioned inside the hole 713.

The first protruding part 720 is disposed along a circumference of the hole 713. The first protruding part 720 protrudes from the upper surface of the housing body 710.

The second protruding part 730 is disposed along the circumference of the hole 713. The second protruding part 730 protrudes from the upper surface of the housing body 710.

The first protruding part 720 and the second protruding part 730 may be disposed on the same circumference. In addition, the first protruding part 720 and the second protruding part 730 may be disposed to be spaced apart from each other in the circumferential direction. Holes 740 may be disposed between the first protruding part 720 and the second protruding part 730 in the circumferential direction. Two holes 740 may be disposed. The holes 740 are holes through which the sensors pass.

The circuit substrate 600 is installed on a lower surface 712 of the housing body 710. A first cover 701 may be coupled to a lower side of the housing body 710 to cover the circuit substrate 600.

The first protruding part 720 may include the third protruding parts 721. The third protruding parts 721 protrude upward from an upper surface of the first protruding part 720. The plurality of third protruding parts 721 may be provided.

The second protruding part 730 may include the fourth protruding parts 731. The fourth protruding parts 731 protrude upward from an upper surface of the second protruding part 730. The plurality of fourth protruding parts 731 may be provided.

The third protruding parts 721 are to be coupled to the first brackets 321. The fourth protruding parts 731 are to be coupled to the second brackets 421.

Holes 750 in which the first gear 1100 and the second gear 1200 are disposed may be disposed in the housing body 710.

FIG. 31 is a view illustrating the housing in which the collectors and the sensors are disposed.

Referring to FIG. 31, the first collector 300 and the second collector 400 are coupled to the housing 700.

The first extension 320 is disposed outside the first protruding part 720. The first bracket 321 is coupled to the third protruding part 721. The third protruding part 721 is press-inserted into the hole formed in the first bracket 321. After the press-insertion, the third protruding part 721 may be fused.

The second extension 420 is disposed inside the second protruding part 730. The second bracket 421 is coupled to the fourth protruding part 731. The fourth protruding part 731 is press-inserted into the hole formed in the second bracket 421. After the press-insertion, the fourth protruding part 731 is fused.

The first sensor 500A is disposed between the first-1 collector body 310A and the second-1 collector body 410A.

The second sensor 500B is disposed between the first-2 collector body 310B and the second-2 collector body 410B.

The first gear 1100 and the second gear 1200 may be rotatably disposed on an upper surface 711 of the housing body 710. The first gear 1100 or the second gear 1200 is engaged with the main gear 121 of the stator body 120. A second cover 702 may be disposed at an upper side, at which the first gear 1100 and the second gear 1200 are disposed, of the housing body 710. The second cover 702 is coupled to the housing body 710.

FIG. 32 is a cross-sectional view illustrating a connector housing and a pin of the housing.

Referring to FIG. 32, the housing 700 includes a connector housing 760 and a pin 770. The pin 770 electrically connects the circuit substrate 600 and an external cable. One side of the pin 770 is connected to the circuit substrate 600 disposed at a lower side of the housing 700. The other side of the pin 770 is exposed inside the connector housing 760. An entrance of the connector housing 760 may be perpendicular to the axial direction. The pin 770 may have a shape bent in a "1" shape.

FIG. 33 is a view illustrating the first member and the second member, and FIG. 34 is a view illustrating the first member and the second member installed in the stator holder.

Referring to FIGS. 33 and 34, the first member 800 is for preventing a sidewall of the hole 713 of the housing body 710 from being worn and for preventing coaxial misalignment of the sensing device. As described above, the first tooth 132 and the second tooth 142 are disposed to overlap in the radial direction. In addition, the sensors 500 are disposed between the first tooth 132 and the second tooth 142 in the radial direction. Accordingly, in a case in which shaking occurs in the radial direction, since distances between the first tooth 132, the sensors 500, and the second tooth 142 are changed, the sensing device may be damaged critically, or a performance problem of the sensing device may occur.

The first member 800 may be a member having a ring shape. The first member 800 may include a body 810 and a flange part 820. The body 810 is a cylindrical member. The body 810 may be disposed along an inner wall of the hole 713 of the housing body 710. The body 810 is disposed between the outer circumferential surface of the stator holder 110 and the inner wall of the hole 713 of the housing body 710. The flange part 820 has a shape extending from a lower end of the body 810 in the radial direction. The flange part 820 is disposed to be contactable with the lower surface of the housing body 710. In addition, the flange part 820 may be disposed to cover one portion of the first cover 701. In addition, the first member 800 may be formed of a metal material.

A lower surface of the flange part 820 may be in contact with an upper surface of the second member 900.

The first member 800 physically separates the hole 713 of the housing body 710 from the stator holder 110 when the stator holder 110 rotates, and thus the first member 800 serves to prevent the inner wall of the hole 713 of the housing body 710 from being worn when the stator holder 110 rotates. As a result, the first member 800 secures coaxial rotation of the stator holder 110.

The housing 700 is hooked on the main gear 121 of the stator body 120 and thus is not separated upward from the stator 100 in the axial direction. However, the housing 700 may be separated downward from the stator 100. The second member 900 serves to prevent the housing 700 from being separated downward from the stator 100. The second member 900 may have a c-ring shape. The second member 900 may be formed of a metal material. The second member 900 may be formed of an elastically deformable material.

The second member 900 is coupled to the groove 111 of the stator holder 110. The groove 111 is concavely formed along the outer circumferential surface of the stator holder 110. The second member 900 is positioned under the lower surface of the housing body 710 in a state in which the second member 900 is coupled to the stator holder 110. In addition, the second member 900 may be disposed under the first member 800 to support the lower surface of the flange part 820 of the first member 800.

FIG. 35 is a view illustrating the first gear 1100 and the second gear 1200 which are engaged with the main gear 121.

Referring to FIGS. 2 and 35, the first gear 1100 and the second gear 1200 which are engaged with the main gear 121 are disposed as sub-gears. The main gear 121, the first gear 1100, the second gear 1200, and third sensors 610 are for measuring an angle of the steering shaft.

The main gear 121 is engaged and rotated with the first gear 1100 and the second gear 1200. The main gear 121 is disposed on the outer circumferential surface of the stator body 120. The first gear 1100 and the second gear 1200 are rotatably disposed on the housing body 710. Gear ratios between the main gear 121, the first gear 1100, and the second gear 1200 are predetermined. For example, in a case in which a total angle of the main gear 121 is 1620°, the first gear 1100 may be designed to rotate 15.6 times and the second gear 1200 may be designed to rotate 14.625 times when the main gear 121 rotates 4.5 times. In this case, the total angle is an angle calculated by accumulating rotation of the main gear 121 when all the gears return to a state before rotating.

Magnets may be disposed on the first gear 1100 and the second gear 1200. The magnets are disposed to face the third sensors 610. The third sensors 610 are mounted on the circuit substrate.

FIG. 36 is a view illustrating a directionality of an external magnetic field with respect to the stator tooth, FIG. 37 is a view illustrating a state in which the sensor avoids an external magnetic field having a z-axis directionality, and FIG. 38 is a view illustrating a state in which the first and second stator teeth avoid an external magnetic field having a y'-axis directionality.

Referring to FIG. 36, an external magnetic field greatly affects the sensing device in the z-axis direction which is the axial direction and the y'-axis direction perpendicular to the z-axis direction. In this case, the y'-axis direction denotes a direction toward the sensor 500, which is the radial direction perpendicular to the axial direction.

Referring to FIG. 37, the sensor 500 of the sensing device according to the embodiment is disposed in a state in which the sensor 500 stands in the z-axis direction. Accordingly, an area of the sensor 500 when viewed in the z-axis is much smaller than an area of the sensor 500 when viewed in the y'-axis direction. Accordingly, the sensing device according to the embodiment has an advantage in that an effect of the external magnetic field on the sensor 500 is small in the z-axis direction.

Referring to FIG. 38, when the state in which the sensor 500 stands in the z-axis direction is considered, a circumferential magnetic field in the y'-axis direction may greatly affect the sensor 500. However, since the circumferential magnetic field in the y'-axis direction is induced along the first stator tooth 130 and the second stator tooth 140, the circumferential magnetic field flows without affecting the sensor 500. Accordingly, the sensing device according to the embodiment has an advantage in that an effect of the external magnetic field on the sensor 500 is also small even in the y'-axis direction.

FIG. 39 is a graph showing a comparison of an amount of change in angle with respect to an external magnetic field in the z-axis direction between a comparative example and an example.

Referring to FIG. 39, in the case of the comparative example, a sensing device has a structure in which a stator tooth is vertically disposed and a sensor is horizontally disposed, and it may be seen that, as an external magnetic field in a z-axis direction increases, an amount of change in angle increases linearly, and thus the measured angle is greatly changed according to the external magnetic field.

Conversely, in the case of the example, it may be seen that, even when an external magnetic field in a z-axis direction increases, a change in angle barely occurs, and thus the angle is barely affected by the external magnetic field.

FIG. 40 is a graph showing a comparison of an amount of change in angle with respect to the external magnetic field in the y'-axis direction between the comparative example and the example.

Referring to FIG. 40, in the case of the comparative example, the sensing device has the structure in which the stator tooth is vertically disposed and the sensor is horizontally disposed, and it may be seen that, as an external magnetic field in the y'-axis direction increases, an amount of change in angle increases linearly, and thus the measured angle is greatly changed according to the external magnetic field.

Conversely, in the case of the example, it may be seen that, even when an external magnetic field in the y'-axis direction increases, a change in angle barely occurs, and thus the angle is barely affected by the external magnetic field.

REFERENCE NUMERALS

| | |
|---|---|
| 100: STATOR | 110: STATOR HOLDER |
| 120: STATOR BODY | 130: FIRST STATOR TOOTH |
| 140: SECOND STATOR TOOTH | 200: ROTOR |

| | |
|---|---|
| 210: ROTOR HOLDER | 220: ROTOR BODY |
| 230: MAGNET | 300: FIRST COLLECTOR |
| 400: SECOND COLLECTOR | |

The invention claimed is:

1. A sensing device comprising:
a stator including a stator tooth; and
a rotor including a magnet,
wherein the stator tooth includes a first stator tooth and a second stator tooth disposed inside the first stator tooth,
wherein the first stator tooth includes a plurality of first teeth, and
the second stator tooth includes a plurality of second teeth,
wherein the first tooth overlaps the second tooth in a radial direction from a center of the stator, and
the stator includes a stator holder and a stator body which is coupled to the stator holder and on which the first stator tooth and the second stator tooth are disposed,
wherein the stator body includes a protrusion,
wherein the protrusion is in contact with a lower end of the first stator tooth or a lower end of the second stator tooth,
the stator body further includes an inner part, an outer part and a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the second stator tooth.

2. A sensing device comprising:
a stator including a stator tooth; and
a rotor including a magnet,
wherein the stator tooth includes a first stator tooth having a first radius and a second stator tooth having a second radius,
wherein the first stator tooth includes a plurality of first teeth, and
the second stator tooth includes a plurality of second teeth,
wherein the first tooth overlaps the second tooth in a radial direction from a center of the stator, and
the stator includes a stator holder and a stator body which is coupled to the stator holder and on which the first stator tooth and the second stator tooth are disposed,
wherein the stator body includes a protrusion,
wherein the protrusion is in contact with a lower end of the first stator tooth or a lower end of the second stator tooth,
the stator body further includes an inner part, an outer part and a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the second stator tooth.

3. A sensing device comprising:
a stator; and
a rotor of which at least a portion is disposed in the stator,
wherein the stator includes a stator holder, a stator body coupled to the stator holder, a first stator tooth disposed on the stator body, and a second stator tooth having a radius which is greater than a radius of the first stator tooth,
wherein the first stator tooth includes a first body and a plurality of first teeth connected to the first body and spaced apart from each other, and
the second stator tooth includes a second body and a plurality of second teeth connected to the second body and spaced apart from each other,
wherein the plurality of first teeth and the plurality of second teeth overlap in a radial direction, and
the stator body includes a protrusion,
wherein the protrusion is in contact with a lower end of the first body or a lower end of the second body.

4. A sensing device comprising:
a stator including a stator tooth and a stator holder;
a rotor including a magnet; and
a housing disposed outside the stator holder,
wherein the stator tooth includes a first stator tooth and a second stator tooth disposed inside the first stator tooth,
wherein the first stator tooth includes a plurality of first teeth, and
the second stator tooth includes a plurality of second teeth,
wherein the first tooth overlaps the second tooth in a radial direction from a center of the stator, and
the sensing device further comprises a first member,
wherein the first member is disposed between the housing and the stator holder.

5. A sensing device comprising:
a stator including a stator tooth and a stator holder;
a rotor including a magnet; and
a housing disposed outside the stator holder,
wherein the stator tooth includes a first stator tooth having a first radius and a second stator tooth having a second radius,
wherein the first stator tooth includes a plurality of first teeth, and
the second stator tooth includes a plurality of second teeth,
wherein the first tooth overlaps the second tooth in a radial direction from a center of the stator, and
wherein the stator body includes a protrusion,
the stator body includes an inner part, an outer part, and a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the second stator tooth,
the sensing device further comprises a first member,
wherein the first member is disposed between the housing and the stator holder.

6. A sensing device comprising:
a stator; and
a rotor of which at least a portion is disposed in the stator,
wherein the stator includes a stator holder, a stator body coupled to the stator holder, a first stator tooth disposed on the stator body, and a second stator tooth having a radius which is greater than a radius of the first stator tooth,
wherein the first stator tooth includes a first body and a plurality of first teeth connected to the first body and spaced apart from each other,
the second stator tooth includes a second body and a plurality of second teeth connected to the second body and spaced apart from each other,
wherein the plurality of first teeth and the plurality of second teeth overlap in a radial direction, and
the sensing device further comprises:
a housing disposed outside the stator holder; and
a first member,
wherein the first member is disposed between the housing and the stator holder.

7. A sensing device comprising:
a stator including a stator tooth and a stator holder;
a rotor including a magnet; and
a housing disposed outside the stator holder,
wherein the stator tooth includes a first stator tooth and a second stator tooth disposed inside the first stator tooth,
wherein the first stator tooth includes a plurality of first teeth, and
the second stator tooth includes a plurality of second teeth,
wherein the first tooth overlaps the second tooth in a radial direction from a center of the stator, and
wherein the stator body includes a protrusion,
the stator body includes an inner part, an outer part and a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the second stator tooth,
the sensing device further comprises a second member coupled to the stator holder,
wherein the second member is disposed under the housing to overlap the housing in an axial direction.

8. A sensing device comprising:
a stator including a stator tooth and a stator holder;
a rotor including a magnet; and
a housing disposed outside the stator holder,
wherein the stator tooth includes a first stator tooth having a first radius and a second stator tooth having a second radius, and
wherein the first stator tooth includes a first body having a ring shape and a plurality of first teeth, and
the second stator tooth includes a second body having a ring shape and a plurality of second teeth,
wherein the first stator tooth overlaps the second stator tooth in a radial direction from a center of the stator, and
wherein the plurality of first teeth overlaps respectively the plurality of second teeth in a radial direction from a center of the stator,
in the plurality of first teeth, a width of a lower surface in a circumferential direction is greater than a width of an upper surface in the circumferential direction, the lower surface being adjacent to the first body and the upper surface being opposite to the lower surface, and the sensing device further comprises a second member coupled to the stator holder,
wherein the second member is disposed under the housing to overlap the housing in an axial direction.

9. A sensing device comprising:
a stator; and
a rotor of which at least a portion is disposed in the stator,
wherein the stator includes a stator holder, a stator body coupled to the stator holder, a first stator tooth disposed on the stator body, and a second stator tooth having a radius which is greater than a radius of the first stator tooth,
wherein the first stator tooth includes a first body and a plurality of first teeth connected to the first body and spaced apart from each other,
the second stator tooth includes a second body and a plurality of second teeth connected the second body and spaced apart from each other,
wherein the plurality of first teeth and the plurality of second teeth overlap in a radial direction, and
the sensing device further comprises a second member coupled to the stator holder,
wherein the second member is disposed under the housing to overlap the housing in an axial direction.

10. The sensing device of claim 3, wherein the stator body includes:
an inner part;
an outer part; and
a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the first stator tooth.

11. The sensing device of claim 4, wherein the stator body includes:
an inner part;
an outer part; and
a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the first stator tooth.

12. The sensing device of claim 6, wherein the stator body includes:
an inner part;
an outer part; and
a partition plate connecting the inner part and the outer part,
wherein the protrusion includes a first protrusion and a second protrusion,
wherein the first protrusion protrudes from a lower end of the inner part to be in contact with the lower end of the first stator tooth, and
the second protrusion protrudes from a lower end of the outer part to be in contact with the lower end of the first stator tooth.

13. The sensing device of claim 8, wherein the stator body includes:
  an inner part;
  an outer part; and
  a partition plate connecting the inner part and the outer part,
  wherein the protrusion includes a first protrusion and a second protrusion,
  wherein the first protrusion protrudes from a lower end of the inner part to be in contact with the lower end of the first stator tooth, and
  the second protrusion protrudes from a lower end of the outer part to be in contact with the lower end of the first stator tooth.

14. The sensing device of claim 9, wherein the stator body includes:
  an inner part;
  an outer part; and
  a partition plate connecting the inner part and the outer part,
  wherein the protrusion includes a first protrusion and a second protrusion,
  wherein the first protrusion protrudes from a lower end of the inner part to be in contact with the lower end of the first stator tooth, and
  the second protrusion protrudes from a lower end of the outer part to be in contact with the lower end of the first stator tooth.

\* \* \* \* \*